US011912301B1

(12) United States Patent
Hendy et al.

(10) Patent No.: US 11,912,301 B1
(45) Date of Patent: Feb. 27, 2024

(54) TOP-DOWN SCENARIO EXPOSURE MODELING

(71) Applicant: Zoox, Inc., Foster City, CA (US)

(72) Inventors: Noureldin Ehab Hendy, West Lafayette, IN (US); Chuang Wang, Sunnyvale, CA (US)

(73) Assignee: ZOOX, INC., Foster City, CA (US)

( * ) Notice: Subject to any disclaimer, the term of this patent is extended or adjusted under 35 U.S.C. 154(b) by 315 days.

(21) Appl. No.: 17/117,626

(22) Filed: Dec. 10, 2020

(51) Int. Cl.
*B60W 60/00* (2020.01)
*G06N 3/08* (2023.01)

(52) U.S. Cl.
CPC .. *B60W 60/0011* (2020.02); *B60W 60/00276* (2020.02); *G06N 3/08* (2013.01); *B60W 2400/00* (2013.01)

(58) Field of Classification Search
CPC ....... B60W 60/0011; B60W 60/00276; B60W 2400/00; G06N 3/08; G06N 3/045; G06N 20/00; G05D 1/0088; G05D 1/021; G05D 2201/0213; G05D 1/0214; G05D 1/0221; G06V 10/08
See application file for complete search history.

(56) References Cited

U.S. PATENT DOCUMENTS

| 11,354,913 | B1* | 6/2022 | Houston | G01S 7/417 |
| 2019/0382007 | A1* | 12/2019 | Casas | G06V 20/58 |
| 2021/0124350 | A1* | 4/2021 | Kirigan | G06V 10/762 |
| 2021/0201145 | A1* | 7/2021 | Pham | G06N 3/08 |
| 2021/0341921 | A1* | 11/2021 | Davis | G05D 1/0257 |
| 2021/0394784 | A1* | 12/2021 | Blaiotta | G06N 3/0445 |
| 2021/0403036 | A1* | 12/2021 | Danna | G01C 21/3407 |
| 2021/0406262 | A1* | 12/2021 | Unnikrishnan | G06F 16/248 |
| 2022/0019900 | A1* | 1/2022 | Wong | G06N 3/084 |
| 2022/0156605 | A1* | 5/2022 | Choe | B60W 60/00272 |
| 2022/0164350 | A1* | 5/2022 | Gao | G06V 20/56 |

OTHER PUBLICATIONS

Hoseini, F. S., Rahrovani, S., & Chehreghani, M. H. "A Generic Framework for Clustering Vehicle Motion Trajectories", Cornell University Library, arXiv.org. (Sep. 25, 2020) (Year: 2020).*
J. Rothfuss, F. Ferreira, E. E. Aksoy, Y. Zhou and T. Asfour, "Deep Episodic Memory: Encoding, Recalling, and Predicting Episodic Experiences for Robot Action Execution," in IEEE Robotics and Automation Letters, vol. 3, No. 4, pp. 4007-4014, Oct. 2018, doi: 10.1109/LRA.2018.2860057. (Year: 2018).*

* cited by examiner

*Primary Examiner* — Anne Marie Antonucci
*Assistant Examiner* — Jordan T Smith
(74) *Attorney, Agent, or Firm* — Lee & Hayes P.C.

(57) ABSTRACT

Techniques for analyzing driving scenarios are discussed herein. For example, techniques may include determining a level of exposure associated with scenarios, searching for similar scenarios, and generating new additional scenarios. A driving scenario may be represented as top-down multi-channel data. The top-down multi-channel data may be provided as input to a neural network trained to output a prediction of future events. A multi-dimensional vector representing the scenario can be received as an intermediate output from the neural network and may be stored to represent the scenario. Multi-dimensional vectors representing different scenarios may be stored in a multi-dimensional space, and similar scenarios may be identified by proximity searching of the multi-dimensional space.

20 Claims, 9 Drawing Sheets

MULTI-DIMENSIONAL SPACE
700

TOP-DOWN SCENARIO EXPOSURE MODELING

BACKGROUND

Autonomous vehicles may define routes and navigate along routes partially or entirely without the assistance of a human driver. Various driving simulation systems have been developed to assist with testing, updating, and maintaining operational software and hardware of autonomous vehicles, to ensure the safety and reliability of the vehicles prior to deployment. Simulated data and driving simulation systems can be used to test and validate features of autonomous vehicle systems, including features and functionalities that may be otherwise prohibitive to test in the real world due to safety concerns, time limitations, repeatability, and the like. For example, simulation systems may perform simulations based on driving scenarios to test and improve passenger safety, vehicle decision-making, sensor data analysis, and route optimization. However, classification of driving scenarios and related driving simulations may be challenging, in that some scenarios that appear visually similar may be quite different from the perspective of the sensor data analysis and decision-making systems of the vehicle, while other scenarios that appear visually different may be similar from the perspective of these vehicle systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
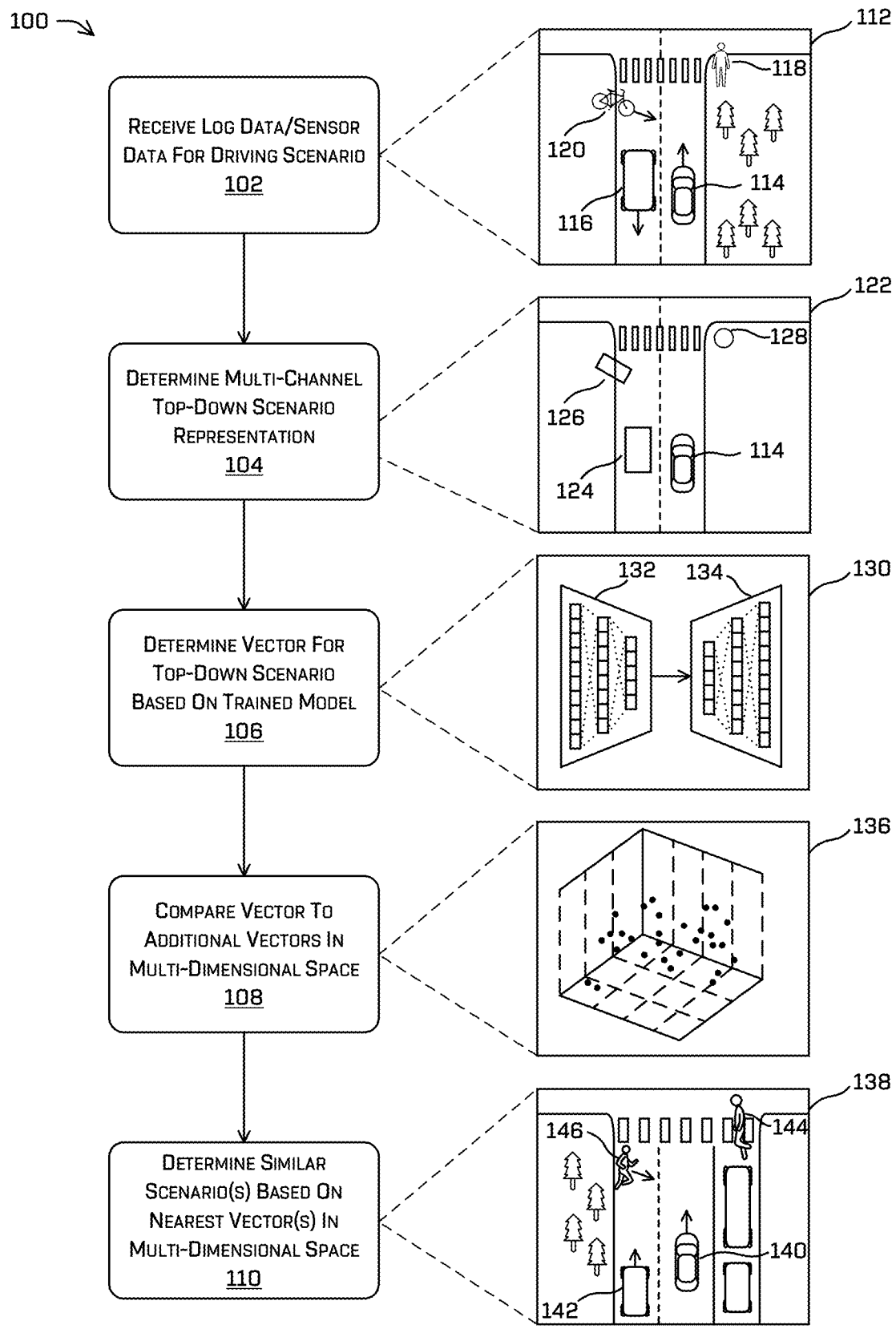
FIG. 1 illustrates an example process of determining one or more similar scenarios based on an input scenario, using a proximity search algorithm in a multi-dimensional space of scenario vectors, in accordance with implementations of the disclosure.

Autonomous vehicles may navigate through physical environments along planned routes or paths. For example, when an autonomous vehicle receives a request to travel to a destination location, the autonomous vehicle may navigate along a planned path from the current location of the autonomous vehicle to a pickup location to pick up a passenger and then from the pickup location to the destination location. While navigating, the autonomous vehicle may encounter dynamic (e.g., vehicles, pedestrians, animals, and the like) and/or static (e.g., buildings, signage, parked vehicles, and the like) objects in the environment. In order to ensure the safety of the occupants and objects, the decisions and reactions of the autonomous vehicles to events and situations that the vehicle may encounter can be modeled and simulated using a plurality of driving scenarios.

A scenario may refer to a real or virtual environment in which an autonomous vehicle may operate over a period of time. Within driving simulation systems, scenarios may be represented as virtual environments in which the software-based systems and features of autonomous vehicles may be tested and validated. Within real-world environments, scenarios can be represented by static and dynamic objects in the physical environment proximate to a vehicle. For scenarios represented in real or virtual environments, the scenarios may include the data representing a road configuration around the vehicle, road conditions, weather conditions, lighting conditions, and various relevant agents and other objects in the environment. For instance, data representing a scenario may include object types, positions, velocities, and other state data for the vehicle itself and for any number of additional static and/or dynamic objects proximate to the vehicle in the environment. Additionally, scenario data may include a representation of the environment over a period of time, rather than a single snapshot of the environment, so that the vehicle systems may receive the scenario as input data, detect changes in the environment over time, and perform one or more driving decisions/determinations based on a predicted future state of the environment.

When testing and validating the systems and features of fully autonomous or semi-autonomous vehicles, it may be valuable to determine additional scenarios that are similar to an input scenario. For instance, when a certain vehicle behavior is observed during one scenario, a driving simulation system may attempt to analyze, isolate, or replicate the same vehicle behavior in other, similar scenarios. Similar scenarios may be targeted for simulation testing to determine the breadth and/or exposure of particular vehicle behaviors, such as system failures and/or software updates. Additionally, when a particular failure or other vehicle behavior is observed in one scenario, it may be valuable to understand how frequency the same failure or behavior is likely to occur during real-world driving situations.

However, there are technical challenges associated with identifying or generating similar scenarios based on an initial input scenario. For instance, conventional systems that analyze scenarios based solely on the visual characteristics of the environment, may fail to detect relevant similar scenarios that may be valuable for testing and validation purposes. For instance, driving scenarios that appear visually similar are often analyzed and processed very differently by the systems and features of autonomous vehicles. As an example, two scenarios may be visually identical except for a minor difference in the classification of an object type, or a small change in position or velocity of an agent, but such minor differences in the environment may cause an autonomous vehicle to execute entirely different operations and/or perform in very ways in response to these different scenarios. Similarly, other scenarios that may appear visually quite different may be classified and analyzed in a similar or identical manner by the autonomous vehicle systems. For instance, two scenarios that have significant differences in the positions, velocities, and other characteristics of several objects in their respective environments may produce large visual differences between the scenarios, but the these differences may be irrelevant to autonomous vehicle systems, which may respond similarly to the scenarios based on other shared commonalities of the scenarios.

The techniques described herein can address technical challenges of identifying similar driving scenarios that may be encountered by autonomous vehicles and may improve on conventional systems. In various examples described herein, a scenario analysis system may receive input data representing a driving scenario and determine atop-down representation of the environment associated with the scenario. For example, sensors of an autonomous vehicle can capture sensor data of an environment, which may include agents separate from the autonomous vehicle, such as other vehicles or pedestrians. A representation of the environment from a top-down perspective or other perspective can be generated based at least in part on the sensor data. The scenario analysis system may provide the top-down scenario representation as input to a machine-learned model trained to output a predicted top-down representation of the scenario for one or more subsequent times. The scenario analysis system then may extract a multi-dimensional vector (or embedding) representing the scenario from an intermediate layer of the trained model, and may compare the vector to other vectors in a multi-dimensional space to detect other scenarios which may be similar or identical to the input scenario.

FIG. 1 illustrates an example process 100 of determining similar driving scenarios based on an input scenario, using a proximity search algorithm in a multi-dimensional space of scenario vectors. In some examples, some or all of example process 100 may performed by various components of a scenario analysis system, described in more detail below.

At operation 102, a scenario analysis system may receive data associated with a scenario in which an autonomous vehicle may operate. The data received at operation 102 may include log data and/or sensor data captured by a vehicle operating in an environment. As noted above, the scenario data may be captured based on simulations of vehicle systems in virtual environments, or based on the actual operation of a vehicle operating in the physical world. The scenario data captured at operation 102 may include any data relating to the vehicle (e.g., vehicle type, size, weight, position, pose, velocity, etc.) and/or to the environment surrounding the vehicle. Such data may include the driving conditions (e.g., weather, road conditions, sun position and time and day, etc.) and characteristics of any static or dynamic objects in the areas proximate to the vehicle in the environment.

An example of simplified driving scenario 112 is shown in association with operation 102. In this example, the scenario 112 depicts a vehicle 114 traveling northbound along a road approaching a crosswalk. The sensor data and/or log data associated with vehicle 114 includes a southbound vehicle 116 detected alongside the vehicle 114, a stationary pedestrian 118 waiting at the crosswalk, and a bicycle 120 that has come into view and is attempting to cross the road at an angle toward the vehicle 114. Although only objects 114-120 have been depicted in example scenario 112, it should be understood that the scenario data received at operation 102 may include any combination of characteristics of the vehicle 114 and/or any other static or dynamic objects in the environment. Additionally, the scenario data may include vehicle and environment data captured over a period of time sufficient for the scenario to be observed, analyzed, and acted upon by the vehicle systems. In some instances, the scenario data received in operation 102 may include data representing the environment of a vehicle over a predetermined time window, such as 0.5 secs, 1 sec, 1.5 secs, 2 sec. 2.5 secs, 3 secs, and so on, during which the systems and features of an autonomous vehicle may detect, analyze, and react to the input data provided by the scenario.

At operation 104, the scenario analysis system may determine a top-down representation 122 of the scenario 112, based on the log data and/or sensor data received at operation 102. For instance, the top-down representation 122 may include an image representing the environment around the vehicle 114 from a top-down perspective can be generated based at least in part on the sensor data. In various examples, the top-down image determined in operation 104 may include semantic information of the vehicle 114, the environment, and/or one or more agents within the environment. With respect to the agents, such semantic information may comprise bounding boxes (e.g., 124-128) having extents (e.g., identifying the bounding box as being associated with a vehicle), movement information associated with the bounding box (e.g., velocity, acceleration, etc.), classification information (whether the box represents a vehicle, pedestrian, bicyclist, motorcyclist, etc.). With respect to the environment, the top-down representation 122 may comprise semantic information indicative of speed limits, lane widths, lane ends, stop lines, traffic lights, traffic light states, and the like as described in more detail herein. In some examples, operation 104 may include generating a plurality of top-down representations of the scenario 112 at different points in times.

Sensor data captured by the vehicle 114 can include LIDAR data, RADAR data, image data, time of flight data, SONAR data, and the like. Although representations of a scenario 112 may be described herein as images, it can be understood in the context of this disclosure that images need not refer to visual images captured by a camera or other image sensor, but also may include LIDAR images, RADAR images, SONAR images, and/or any other sensor-based representation of a scenario. Representations of scenarios also may include combinations of various sensor data (e.g., image data, LIDAR data, RADAR data, etc.), and/or sensor data that has been processed using various data processing techniques. The scenario representations resulting from such techniques may include encoding schemas and/or matrix representations of scenarios which based on visual and/or non-visual data. As described below, a scenario representation may be single channel representation, or a multi-channel representation in which each channel contains data representing one or more aspects (e.g., features, signals, or attributes) of the input data within the overall representation.

In some cases, the sensor data can be provided to a perception system configured to determine a type of the nearby agents (e.g., vehicle, pedestrian, bicycle, animal, parked car, tree, building, and the like) in the environment of the scenario 112. Further, the perception system can determine, based on the sensor data, movement information about the agents in the environment. The sensor data and any data based on the sensor data can be represented in the top-down representation(s) 122 of the scenario 112 determined in operation 104. For example, a top-down representation 122 may include an image representing agents as two-dimensional bounding boxes 124-128 based on a location of the agent in the environment as well as an extent of the agent (e.g., the length and width of the agent), and a classification of the agent (e.g., vehicle, pedestrian, and the like). Movement information such as velocity information can be represented as a velocity vector associated with the bounding box, although other representations are contemplated.

Certain examples herein may relate to determining top-down representations of a scenario and providing input data based on the top-down representations to a trained model. However, it can be understood in the context of this disclosure that the techniques described herein are not limited to top-down scenario representations. As another example, instead of (or in addition to) a top-down representation, the scenario analysis system may partition the environment around the vehicle into a number of discreet regions, and may determine a set of characteristics (e.g., occupancies) for each the region of the environment at different time intervals during the scenario. As discussed herein, occupancies may refer to discrete arrangements of objects with respect to a physical environment based on discretized template of region with respect to map data (e.g., the roadway being traveled by the capture vehicle) and/or the position of the vehicle within the map data. For example, details of determining occupancies within regions, clustering or organizing/arranging the occupancy data into hierarchies to model scenarios, are discussed in U.S. application Ser. No. 16/866,715, which is herein incorporated by reference in its entirety.

At operation 106, the scenario analysis system may determine a vector associated with the scenario representation (e.g., top-down, occupation based, etc.) representation of the scenario determined in operation 104. In some examples, a multi-dimensional vector associated with the scenario 112 may be determined by providing the top-down representation of the scenario 112 (or plurality of top-down representations corresponding to different points in time) as input to a trained model comprising a neural network. As depicted in this example, the techniques discussed herein may use an encoder-decoder system 130 including a neural network configured to model a predicted future state associated with the scenario 112. In this example, an encoder 132 maps the four-dimensional input tensor (e.g., time×space×channels) into an internal latent representation, and a decoder 134 uses the internal representation to model an output distribution of one or more states associated the scenario 112 at a predetermined future time or set of future time offsets (e.g., 1 second in the future, 2 seconds in the future, . . . , n seconds in the future, etc.).

For instance, the trained model used in operation 106 may include any model configured to output an autonomous driving-related determination and/or vehicle control decision, based at least in part on the input data associated with the scenario 112 (e.g., one or more top-down representations). In various examples, the trained model may include models configured to predict probabilities associated with possible locations and/or predicted trajectories of various objects or agents in the scenario 112, models configured to can be generated based on the prediction probabilities and output to a planning system to control an operation of the autonomous vehicle, models configured to predict interactions or collisions between the vehicle 114 and other objects or agents, models to predict a future state of one or more objects in the environment, etc.

The output of the trained model used in operation 106 may include an analysis of the sensor data, a driving determination, and/or a vehicle control decision based on the input scenario. In some cases, the trained model accessed in operation 106 may output a vehicle control action to be taken by an autonomous vehicle (e.g., a steering control, propulsion, braking, safety action, emitter action, communication action, etc.) in response to the driving scenario. In other examples, a trained model may output a route determination, object interaction/collision prediction, or a prediction of a future state of one or more objects in the environment, such as future object positions, velocities, poses, and/or interactions.

Further, as discussed below in the context of FIGS. 4A and 4B, the scenario representation data input into the prediction system may be decomposed into a plurality of channels prior to input into the prediction system (e.g., FIG. 4A) or may be input into the prediction system without generating a plurality of channels (e.g., FIG. 4B).

As described herein, a neural network may refer to an algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

As noted above, the trained model used in operation 106 (e.g., the encoder-decoder system 130) may include a neural network comprising multiple layers of nodes, beginning with an input layer of nodes configured to receive scenario input data (e.g., top-down representation(s)), one or more intermediate node layers, and an output layer to provide to the output of the trained model based on the input top-down scenario representations. After providing the input (e.g., top-down representation(s) 122) to the trained model in operation 106, the scenario analysis system may determine a vector (e.g., a multi-dimensional vector or embedding) based on an intermediate output of the trained model. In some examples, the scenario analysis system may extract a multi-dimensional vector based on the outputs from the nodes of an intermediary layer of the neural network (e.g., a reduced dimensionality encoding layer), rather than the final output of the neural network. The graphical depiction of the encoder-decoder system 130 includes a simplified representation of a neural network, including an input layer on the left side of the encoder 132, one or more intermediate encoding layers, additional intermediate decoding layers, and an output layer on the right side of the decoder 134. In various examples, any of the intermediate layers of network nodes within the encoder 132 and/or decoder 134 may be used to define the vector.

For neural networks having multiple intermediate layers, the scenario analysis system may use any of the intermediate layers, or any combination of intermediate layers (e.g., any subset of nodes within one or more layers of the neural network) to define the vector. The vector may correspond to the set of outputs received from the selected nodes of the selected intermediate layer(s), in response to the top-down scenario representation(s) provided as input to the neural network. In various examples, intermediate layers of the encoder-decoder system 130 (or other neural network) may have multiple nodes, and therefore a vector may correspond to a multi-dimensional vector comprising a set of multiple data points. As discussed below, a vector may be represented by a point or vector in an N-dimensional space, where the number of dimensions (N) equals the number of nodes in the intermediate layer selected to define the vector. As discussed below in reference to FIGS. 6A and 6B, a multi-dimensional vector defined based on an intermediate layer of a neural network may be reduced in dimensionality as compared to the input layer and/or output layer of the neural network, but may nonetheless include dozens or hundreds of dimensions.

As depicted in this example, for the encoder-decoder system 130 and/or other predictive neural networks, the numbers of nodes in the intermediate layers may decrease within the encoder 132 as the data moves further from the input layer. In such implementations, the scenario analysis system may select an earlier (upstream) intermediate layer from which to extract vectors, which may provide larger vectors that more accurately represent the scenario 112, but which also may be more computationally expensive to store and compare within a multi-dimensional space. In other implementations, the scenario analysis system may select a later (downstream) intermediate layer (e.g., a smallest or lowest dimensionality encoding layer) from which to extract vectors, which may provide smaller vectors that are more computationally efficient to store and compare within a multi-dimensional space.

In some examples, the trained model may output determinations for autonomous vehicle systems based on a combination of input data that can include objective driving scenario input data (e.g., the driving environment, states of objects/agents, etc.) as well as additional non-objective inputs (e.g., human and/or algorithmic decisions or priorities). In such cases, the scenario analysis system may select an intermediate layer within the neural network that is based largely or entirely on the objective driving scenario input data, thereby producing a vector that more accurately represents the observable and objective driving scenario.

Although this example depicts an encoder-decoder system 130 having a multi-layer neural network configured to output predictions of top-down scenario representations, in other examples various different types of trained models may be used. For instance, the trained model used in operation 106 may include various predictive models and other trained models using neural networks that may execute within a processing pipeline of a perception system, prediction system, and/or a planning system of the vehicle 114. For instance, instead of or in addition to capturing the output from an intermediate layer of the trained encoder-decoder system 130, in other examples the trained model may be a model configured output an autonomous vehicle control decision or other autonomous driving-related determination, based on input data including scenario representations. Other trained models may include perception, prediction, or planning models configured to analyze the current scenario and environment in order to compress the scenario into a lower dimensionality from which the scenario may be reconstructed, or to predict future states of the agents, the environment, etc. The trained model also may be configured to output a vehicle control determination based on the scenario, such as determination of a route or path planning system, a collision prediction/avoidance system, a navigation system, an object/agent prediction system, etc.

At operation 108, the scenario analysis system may compare the vector from operation 106 to a data store of additional vectors representing different scenarios. The scenario analysis system may represent each vector as a point or vector in a multi-dimensional space, and may apply a proximity search algorithm (e.g., a nearest neighbor algorithm) in the multi-dimensional space to determine the closest additional vector(s) to the vector from operation 106. A graphical depiction of a simplified multi-dimensional space 136 is shown in association with operation 108. In this example, different vectors based on driving scenarios are represented as dots in the three-dimensional space 136. However, in other examples a multi-dimensional scenario representation space may include dozens or hundreds of dimensions. Depending on the algorithms used and the scale/dimensionality of the space to be searched, the identification of the closest additional vector(s) in operation 108 may or may not be performed with mathematical certainty. In some cases, the scenario analysis system may fully compute a closest distance to all other vectors across all dimensions to definitely select a desired number of closest vectors. In other cases, the scenario analysis system may improve the computational efficiency by selecting the closest vector(s) identified in the multi-dimensional space within a certain time or based on a sufficient degree of confidence. In certain examples, only certain dimensions may be chosen to compare similarity between vectors and other dimensions ignored. For example, certain dimensions may be correlated to a certain sensor system, object being detected, environment, or other aspect of a scenario.

At operation 110, the scenario analysis system may determine additional scenario(s) similar to the driving scenario received in operation 102, based on the closest additional vector(s) identified in the multi-dimensional scenario representation space. To determine and output the similar driving scenarios, the scenario analysis system may use the vectors identified in operation 108 to look up and retrieve stored driving scenarios associated with the vectors. In various examples, the scenario analysis system may be configured to retrieve the N most similar driving scenarios based on the input scenario. Additionally or alternatively, scenario analysis system may be configured to retrieve all scenarios meeting or exceeding a predetermined similarity threshold, which may be based on the distance calculation between the vectors in the multi-dimensional space.

Another example of simplified scenario 138 is shown in association with operation 110. In this example, the scenario 138 may represent a driving scenario selected based on the techniques described herein as a similar scenario to the example input driving scenario 112 discussed above. In this example, scenario 138 depicts a vehicle 140 traveling northbound along a road approaching a crosswalk. Vehicle 140 is traveling alongside another northbound vehicle 142 on its left, and is adjacent to a row of parked cars on its right. A walking pedestrian 144 is preparing approaching the crosswalk, and a jogging/running pedestrian 146 is attempting to cross the road at an angle toward the vehicle 140. As in scenario 112, only a limited number of objects 140-146 are depicted in example scenario 138, but it should be understood that the scenario(s) determined at operation 110 may include any combination of characteristics of the vehicle 140 and/or any other objects in the environment.

As discussed in more detail in the examples below, the scenario analysis system may use the scenarios determined in operation 110 in a variety of simulations and other autonomous vehicle testing and validation operations. For instance, after identifying a number of similar scenarios based on an input scenario, a driving simulation system may execute a number of simulations based on the similar scenarios. For instance, in some examples the scenario analysis system may determine that there are an insufficient number of similar scenarios (e.g., based distance calculation between the vectors in the multi-dimensional space), and may initiate a process to generate new synthetic scenarios that are similar to the input scenario. For instance, the scenario analysis system may perturb one or more input data values associated with the input scenario to generate a modified scenario, and then may calculate a distance between the vectors for the input scenario and modified scenario in the multi-dimensional space to determine if the modified scenario is sufficiently similar. In certain embodiments, a vector may be perturbated to generate a new vector and/or a vector be generated by similarity to other vectors (e.g., by taking an average between two or more vectors generated from log data).

Additionally or alternatively, the scenario analysis system may use the number of similar vectors and/or scenarios identified in operations 108 and/or 110 to determine an exposure level for a particular system failure or other vehicle behavior. For instance, if the data store of vectors corresponds to the log data collected by a fleet of autonomous vehicles operating in real-world environments, then the number of similar scenarios identified by the scenario analysis system may correspond to the frequency at which a particular scenario occurs during real-world driving situations.

In some examples, the scenario analysis system may execute within an autonomous vehicle, and may be configured to perform various actions associated with the autonomous vehicle based on identifying similar vectors and/or scenarios in operations 108 and/or 110. For instance, the scenario analysis system executing within the autonomous vehicle (e.g., in a physical environment or within a simulation) may use the techniques described herein to compare the current scenario to a repository of previously encountered driving scenarios. The repository of previously encountered driving scenarios may be stored onboard the autonomous vehicle or in a separate remote server, and the previous driving scenarios may be labeled based on a risk or probability level of a collision, injury, or other safety-related risk, etc. If the scenario currently encountered by the autonomous vehicle is within a similarity threshold of one or more other scenarios labeled as having a risk value greater than a threshold (e.g., vectors are within a predetermined distance in the multi-dimensional space), the autonomous vehicle may determine a vehicle control action to be performed, such as the activation of a collision avoidance system (CAS) or the initiation of a remote teleoperations computing device at the autonomous vehicle. In various examples, the similarity of the current scenario of the autonomous vehicle to one or more similar high-risk scenarios may be used as a determining factor for activating or not activating a CAS, or may be used as weight value or an input into a separate model configured to determine when to activate a CAS or teleoperations device. The similarity data between the current scenario and previously stored and labeled scenarios also may be used to determine additional vehicle control actions such as lane changes, turning or braking actions, and the like, for the autonomous vehicle, or to determine a particular route or trajectory for the vehicle.

The process 100 and various other examples described herein thus provide improved techniques for identifying similar driving scenarios based on an input scenario. In contrast to conventional systems that classify scenarios based only on visual or sensor-based analyses of the scenario environment, the techniques described herein can select similar scenarios by extracting vectors from intermediate layers of trained models configured to output predicted future top-down scenario representations and/or other predictive states associated with the scenario. Thus, the similarity of a scenario may be determined based on a combination of input data provided to the trained model, representing the objective driving environment associated with the scenario, and an embedding (i.e., one or more vectors) from an intermediated layer from the trained model, the embedding associated with a predictive decision or determination made by an autonomous vehicle in response to the input scenario. Therefore, unlike conventional systems, the techniques described herein may successfully identify relevant scenarios as similar in cases when the visual characteristics of the environment are significantly different, and also may successfully exclude irrelevant scenarios as dissimilar even when the irrelevant scenario has a similar or identical visual environment.

In some examples, the techniques described herein may be used to identify similarities between driving scenarios and/or to create new synthetic scenarios that may be used by driving simulation systems to test and validate autonomous vehicle systems. In various applications of these techniques, driving simulations may be used to determine constraints or limitations of autonomous vehicles that may be used in the autonomous controllers, navigation systems, route or path planning systems, and the like. For instance, simulations may be used to understand the operational space of an autonomous vehicle in view of surface and/or environmental conditions, faulty components, etc. By way of example, simulations may be used to inform a planner system of a vehicle not to exceed a given acceleration or velocity based on a number of objects in the environment and/or presence of precipitation, etc. Simulations may also be used to capture and generate feedback for improving operations and designs of autonomous vehicles and the vehicles software. For instance, in some examples, simulations may be useful for determining an amount of redundancy that is required in various components of the autonomous vehicle, or how to modify a behavior of the autonomous vehicle based on what is learned through the results of one or more simulations. Furthermore, in additional or alternative examples, simulations may be useful to improve the hardware design of the autonomous vehicles, such as optimizing placement of sensors with respect to a chassis or body of the autonomous vehicle.

As used herein, the sensor data may represent objects and/or conditions of the physical environment encountered by an operating vehicle. In some instances, the sensor data may include data captured by sensors such as time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The log data can include sensor data captured by one or more sensors of the vehicle, perception data indicating objects identified by one or more systems onboard the vehicle (or produced during a post-processing phase), prediction data indicating an intent of objects (whether produced during the recording or subsequent thereto), and/or status data indicating diagnostic information, trajectory information, and other information generated by the vehicle. The vehicle may transmit the log data, via a network, to a database that stores log data and/or to a computing device that analyzes the log data.

Figure 2:
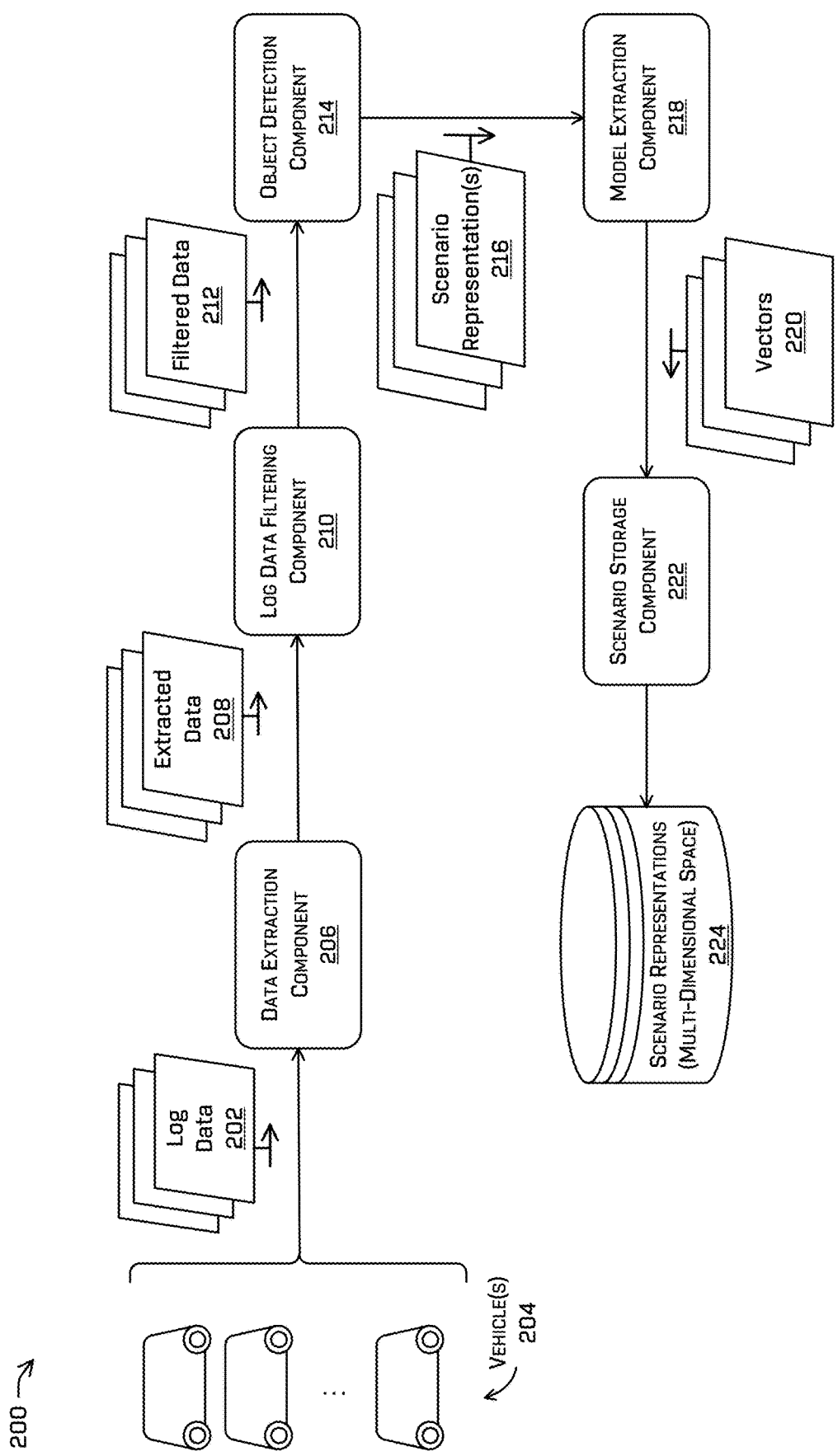
FIG. 2 is an example block-diagram illustrating an example architecture of a system for analyzing and storing scenarios, in accordance with implementations of the disclosure.

FIG. 2 is an example block-diagram illustrating an example architecture of a scenario analysis system 200 configured to analyze and store representations of driving scenarios. As discussed above, scenario analysis and synthetic scenario generation for use with simulation, modeling, and testing autonomous vehicles systems and software may assist with improving overall operations of the autonomous vehicles when encountering new or unexpected situations. In the current example, log data 202 may be received from one or more vehicles 204 operating on various roadways in real world conditions and environments. As discussed above the log data 202 may include sensor data, perception data, prediction data, trajectory information, and the like.

The log data 202 may be processed by a data extraction component 206. The data extraction component 206 may be configured to parse log data received from one or more vehicles 204 based on a set time interval (e.g., every 40 milliseconds, every 80 milliseconds, every 200 milliseconds, etc.). For each time interval, the data extraction component 206 may define a set of regions surrounding the vehicle 204. In some cases, the regions may be defined based on lanes designations within the environment and relative to the position of the vehicle capturing the sensor data and generating the log data 202.

In some implementations, the data extraction component 206 may determine an existence of objects within each of the defined or discrete regions. For example, one or more objects may be present in each region. The data extraction component 206 may then determine or identify a classification or type associated with each object in each region. The data extraction component 206 may then select or determine a representative object of each classification or type within each region. Parameters associated with the representative objects and the vehicle 204 as well as features of the environment may be extracted from the log data 202 by the data extraction component 206. For example, the vehicle parameters may include, but are not limited to, current drive mode, current drive state, planned maneuver, total velocity, total acceleration, longitudinal acceleration, lateral acceleration, distance to an intersection, longitudinal acceleration, lateral acceleration, yaw, yaw rate, lane identifier, road identifier, Euclidian position, and the like.

The extracted data 208 (e.g., the regions, representative objects, parameters, features, etc.) may then be modeled such as by a statistical modeling technique or, in some cases, by using one or more stochastic model, by a log data filtering component 210. For example, the log data filtering component 210 may associate the extracted data 208 corresponding to each time interval represented by the log data 202 to one or more models in order to generate filtered data 212. In some cases, the filtered data 212 may be sparse data associated with events or arrangements of objects, parameters, and object states relative to the vehicle. In some cases, the log data filtering component 210 may perform filtering to remove or prevent non-relevant or impossible/improbable data (such as log data representing physically impossible parameters) from being incorporated into top-down scenario representations 216. For example, the log data filtering component 210 may filter data that represents measurements or distances outside of defined threshold or limitations (e.g., removing data representing a vehicle that is 25 meters long).

An object detection component 214 may receive the filtered data 212 and may generate top-down scenario representations 216 which may include vectorized data defining representative objects in the scenario. In some cases, the top-down scenario representation 216 may comprise parameters associated with the vehicle itself, and features of any agents within the scenario and/or the physical environment from which the log data 202 was generated. As introduced above, a top-down scenario representation 216 may include image(s) (and/or other types of encodings or representations) that represent the environment at time $T_{-N}$, and may include one or more bounding boxes representing a location and extent (e.g., length and width) of the agents at the indicated times. Further, the top-down scenario representation can include a bounding box representing the autonomous vehicle, and/or other objects in the scenario environment. As can be understood, each top-down scenario representation 216 may include any number of static objects (e.g., buildings, trees, curbs, sidewalks, map elements, etc.) or dynamic objects (e.g., agents) in the environment at any time, and is not limited to one agent/bounding box.

In some examples, top-down scenario representations 216 can further include velocity information associated with the autonomous vehicle and/or any dynamic objects in the environment, which may be represented as a velocity vector associated with the corresponding bounding box. The top-down scenario representations 216 also may include additional information representing objects in the environment or states of objects in the environment. For example, top-down scenario representations 216 can include lane information or corridor information indicating that a lane associated with a bounding box (e.g., associated with the autonomous vehicle) is controlled by a traffic light.

As can be understood, bounding boxes determined based on objects in an environment can be associated with different locations and/or movement information over time. Accordingly, the top-down scenario representations 216 can include velocity information associated with a bounding box that is the same or different as the corresponding velocity information at a different time. Further, locations of a bounding box may be updated throughout the different scenario representations to illustrate a movement of an agent as the agent traverses the environment.

In some instances, the object detection component 214 may determine frequency of occurrence measurements for a top-down scenario representation 216 within a family or occupation hierarchy. For instance, occupations may be stored based on the arrangement of objects relative to the predefined regions and/or the vehicle. As one illustrative example, the occupations may form a hierarchy of occupations based on an occupancy of the regions or the position of the objects relative to the vehicle. In some cases, the broader or large tiers of the hierarchy may form the top tiers in a reverse pyramid structure. For instance, a first tier or level of the hierarchy may be defined as all occupations in which a first region is occupied by a first type of object regardless of the presence of other objects or the parameters or states associated with the objects. The hierarchy may also include a first sub-tier or level that includes the first region occupied by the first type of object and a second region occupied by a second type of object and a second sub tier or level in which the first region is occupied by the first type of object and the first region is occupied by a second type of object. Thus, a frequency of occurrence related to occupations in which the region to the front of the vehicle is occupied by a motorized vehicle may be determined based on the number and arrangement of sub-occupations within the hierarchy.

A model extraction component 218 may receive and provide the top-down scenario representations 216 as input to one or more trained machine learning models. As discussed above, in some cases a trained model may include an encoder-decoder system configured to output a predicted top-down scenario representation associated with a time in the near future. Additionally or alternatively, the model extraction component 218 may access various models trained to perform different types of autonomous vehicle control decisions and/or driving determinations based on the input data (e.g., a top-down scenario representation). A trained model accessed by the model extraction component 218 may include a neural network with multiple layers of interconnected nodes, and the model extraction component 218 may provide a scenario representation 216 to the input layer of the trained model and then may extract a vector 220 based on the output from one or more intermediate layers, as discussed above.

A vector 220 is the data output by an intermediate layer of the trained model. In some cases, the vector 220 may be stored as a data structure or object representing a point or vector in an N-dimensional space, where the number of dimensions (N) equals the number of nodes in the intermediate layer selected to define the vector. Thus, when the model extraction component 218 selects an upstream intermediate layer from which to extract vectors, the resulting vector 220 may be larger than when the model extraction component 218 selects a downstream intermediate layer for the vector 220. However, in either case, the model extraction component 218 may use the same intermediate layer (and/or combination of layers/nodes) of the same model for all vectors, so that similar scenarios can be determined using a common frame of reference.

The scenario storage component 222 of the scenario analysis system 200 may receive vectors 220 and store the vectors in a scenario representation data store 224. As discussed above, the scenario representation data store 224 may be an N-dimensional space configured to store each vector 220 representing a scenario as a N-point or N-vector data object within the data store 224.

Figure 3:
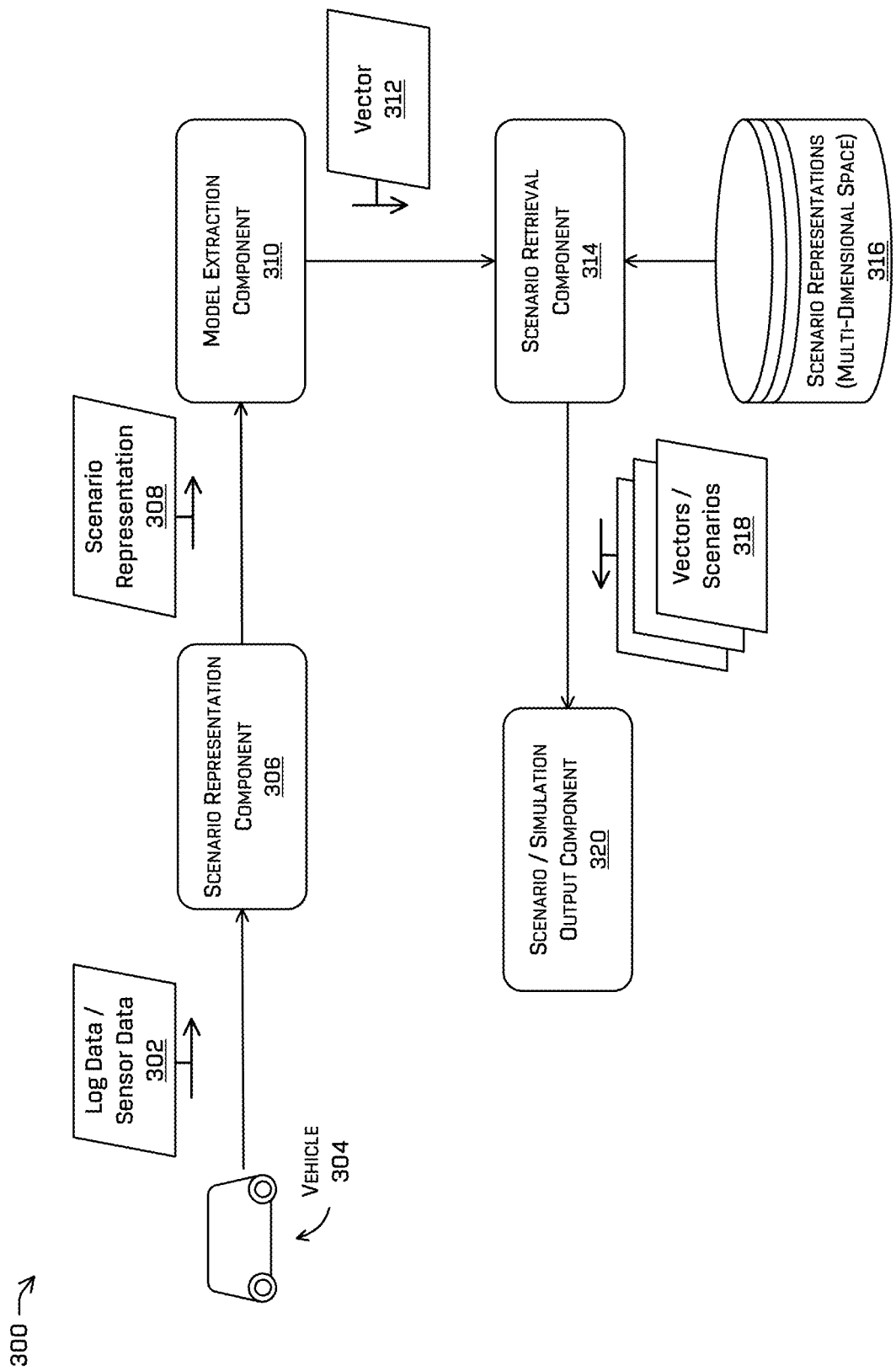
FIG. 3 is an example block-diagram illustrating an example architecture of a system for analyzing and retrieving scenarios, in accordance with implementations of the disclosure.

FIG. 3 is an example block-diagram illustrating another example architecture of a scenario analysis system 300 configured to analyze and retrieve similar scenarios based on an input scenario. In some implementations, the scenario analysis system 300 may be similar or identical the scenario analysis system 200 described above, although different components are depicted in this example to illustrate the different scenario analysis operations performed. For instance, while the scenario analysis system 200 of FIG. 2 includes components configured to receive, analyze, and store scenario representations in a data store 224, the scenario analysis system 300 includes additional components configured to receive and analyze an input scenario and then retrieve additional scenario(s) similar to the input scenario.

In this example, sensor data and/or log data 302 may be received from a vehicle 304 operating within a real world or simulated environment. As discussed above the log data 302 may include sensor data, perception data, prediction data, trajectory information, and the like. The scenario representation component 306 in this example may be configured to perform the various scenario analysis operations of the data extraction component 206, log data filtering component 210, and/or object detection component 214, described above.

The scenario representation component 306 may perform these functions described above, and may output a scenario representation 308 (e.g., a top-down representation) based on the received sensor data and/or log data 302. As discussed above, the top-down scenario representation 308 may include bounding boxes and associated attributes (e.g., positions, extents, velocities, poses, trajectories, etc.) for the vehicle, other agents, and other static or dynamic objects in the environment associated with a scenario, and different scenario representation data may be determined for different time intervals.

The model extraction component 310 may perform similar or identical operations to those described above for the model extraction component 218. For instance, the model extraction component 310 may provide a top-down scenario representation 308 as input data to one or more trained models (e.g., an encoder-decoder system to predict a future top-down scenario representation), and may extract a vector 312 based on the output of an intermediate layer within a neural network of the trained model. The vector 312 may be a data set or data object representative of the scenario corresponding to the sensor data and/or log data 302. As noted above, the vector 312 used to retrieve similar driving scenarios may be extracted from the same trained model and the same intermediate layer as any vectors 220 that were previously generated and stored in the multi-dimensional space.

The scenario retrieval component 314 may be configured to access the multi-dimensional scenario representations data store 316, to retrieve one or more vectors based on the vector 312 associated with the input scenario. In some examples, the scenario retrieval component 314 may use a nearest neighbor algorithm or other multi-dimensional proximity search, using the vector 312 as input, to select additional scenarios and/or vectors 318 within the scenario representations data store 316. The additional scenarios/vectors 318 selected by the scenario retrieval component 314 may represent the closest vectors within the multi-dimensional space of the data store 316, and each additional vector may be associated with a different scenario previously stored in the scenario representations data store 316. In some cases, the scenario retrieval component 314 may select and retrieve a predetermined number (N) of vectors from the data store 316, based on multi-dimensional distance calculations between the selected vectors and the vector 312 corresponding to the input scenario. Additionally or alternatively, the scenario retrieval component 314 may retrieve all vectors from the data store 316 that are within a predetermined similarity threshold to the vector 312.

Additionally, the scenario analysis system 300 includes a scenario/simulation output component 320 configured to output scenarios or simulations based on the scenarios/vectors 318 selected by the scenario retrieval component 314. In some cases, the scenario/simulation output component 320 may use a lookup table to retrieve a scenario associated with each of the vectors retrieved from the scenario representations data store 316. These scenario may represent the scenarios most similar to the sensor data and/or log data 302 of the input scenario. The scenario/simulation output component 320 also may generate additional similar scenarios and/or synthetic simulations based on the scenarios retrieved from the scenario representations data store 316.

In some examples, the scenario/simulation output component 320 may utilize parameters or states of objects corresponding to occupations (e.g., vectorized data) that match or meet simulation criterion to generate a Gaussian mixture model. The scenario/simulation output component 320 may then sample the Gaussian mixture model in order to generate the simulations based on the selected scenarios. In some examples, the scenario/simulation output component 320 may be configured to receive as an input or otherwise access map data of actual roads and/or a physical environment. The scenario/simulation output component 320 may then fit the selected scenarios and/or arranged representative objects based on corresponding parameters (velocity, distance from the vehicle, associated region, direction of travel or trajectory, etc.) to the map data, such that the selected scenarios are feasible at the selected map location or environment.

The scenario/simulation output component 320 may receive or access the selected vectors and/or scenarios 318, in order to generate and execute simulations of various components and software of autonomous vehicles in order to capture or collect simulation data. For example, the scenario data may be used by the scenario/simulation output component 320 to simulate variations of the desired situation represented by the simulation criterion. For example, the scenario/simulation output component 320 may execute a variation of vectorized scenario data in a simulation for testing and validation. As an example, details associated performing simulated testing may be discussed in U.S. application Ser. No. 16/708,019, which is herein incorporated by reference in its entirety. The scenario/simulation output component 320 may also generate performance data indicating how the tested autonomous vehicle performed (e.g., responded) and may compare the simulation data to a predetermined outcome and/or determine if any predetermined rules/assertions were broken/triggered.

Figure 4A:
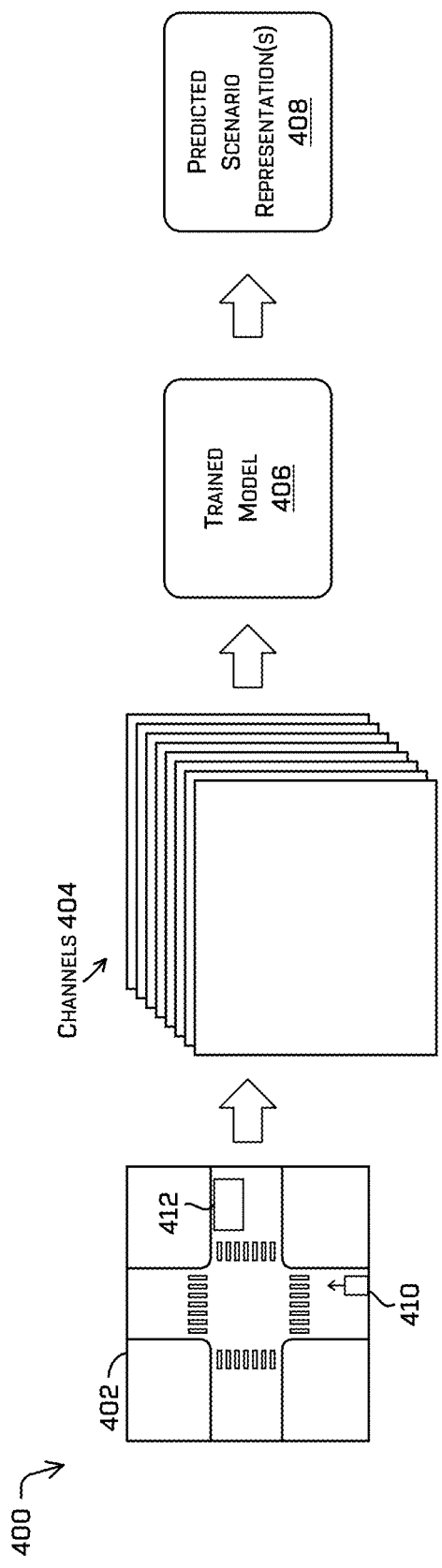
FIGS. 4A and 4B are example illustrations of inputs to a model trained to output one or more predicted top-down scenario representations, in accordance with embodiments of the disclosure.
Figure 4B:
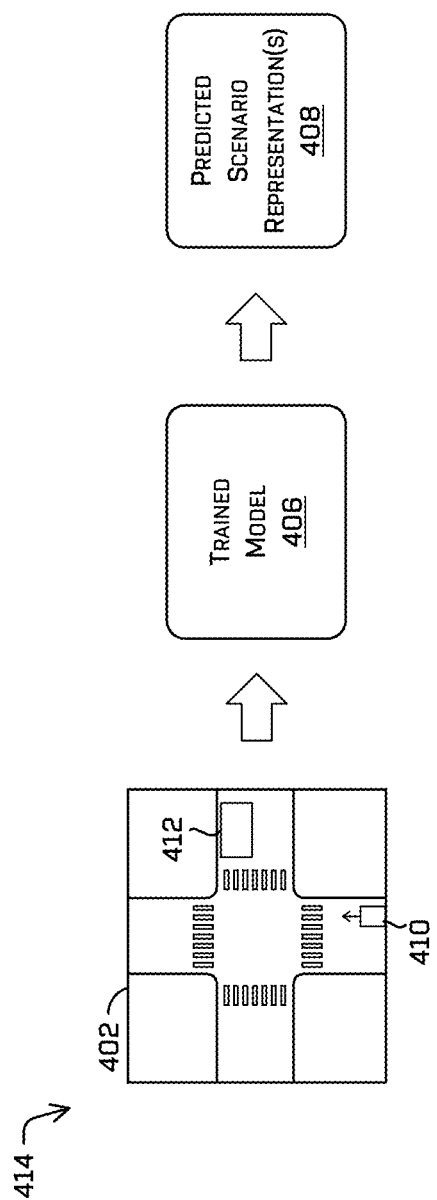

FIGS. 4A and 4B are example illustrations of inputs to the prediction system to determine one or more predicted trajectories, in accordance with embodiments of the disclosure.

FIG. 4A illustrates an example 400 where a top-down representation 402 of a scenario is used to generate a plurality of channels 404, which are subsequently input to a trained model 406 to determine one or more predicted scenario representations 408. In some examples, a top-down representation 402 corresponding to the scenario can be represented by individual channels 404 of a multichannel representation (e.g., image, encoding, matrix representation, etc.), where each channel represents different information about the agent and the environment in which the agent is located. In various examples, each channel of a multi-channel representation can separately encode alike attribute, class, feature, and/or signal within the scenario. Such channels may correspond to semantic information about the scenario, and may be stored as encodings (e.g., binary masks) which identify the locations and characteristics of particular object types and/or occupancies within a grid representation of the scenario. For instance, the individual channels of a multi-channel representation may represent, but are not limited to, one or more of road network information (e.g., semantic labels indicating lanes, crosswalks, stop lines, lane dividers, stop signs, intersections, traffic lights, and the like), traffic light status (e.g., red light, yellow light, green light, etc.), bounding boxes 410 and 412 associated with the vehicle and/or agents, a velocity of the vehicle and/or agents in an x-direction and a y-direction, an acceleration of the vehicle and/or agents in an x-direction and a y-direction, a blinker status of the vehicle and/or agents (e.g., left-turn, right-turn, braking, reverse, hazards, no lights, etc.), and the like. In some examples, the plurality of channels 404 can be input to the trained model 406 to generate at least one predicted scenario representation 408 and/or any other prediction related to the state of the scenario (e.g., predicted agent positions, trajectories, velocities, interactions, etc.). In some examples, a representation 402 of the scenario can be input directly to the prediction system (e.g., without generating a plurality of channels based on the representation) to generate the at least one predicted trajectory.

In some examples, the number of channels may be reduced into fewer channels. As a non-limiting example, a visual representation of the scenario may be reduced into simple 3-channel (e.g., RGB) image used to represent multiple pieces of semantic information. In such an example, a red channel, for instance, may be used to denote a bounding box 410 and the intensity of the red value may be associated with a velocity, acceleration, or the like. Further in such an example, a second channel may encode lane width with intensity indicative of a speed limit, and the like.

FIG. 4B illustrates an example 414 where the top-down representation 402 of the scenario is input to the trained model 406 to determine the predicted scenario representation(s) 408. In contrast to the example 400, the example 414 may not include generating a plurality of channels associated with the representation 402, and may instead include directly inputting the representation 402 into the prediction component 230.

Figure 5:
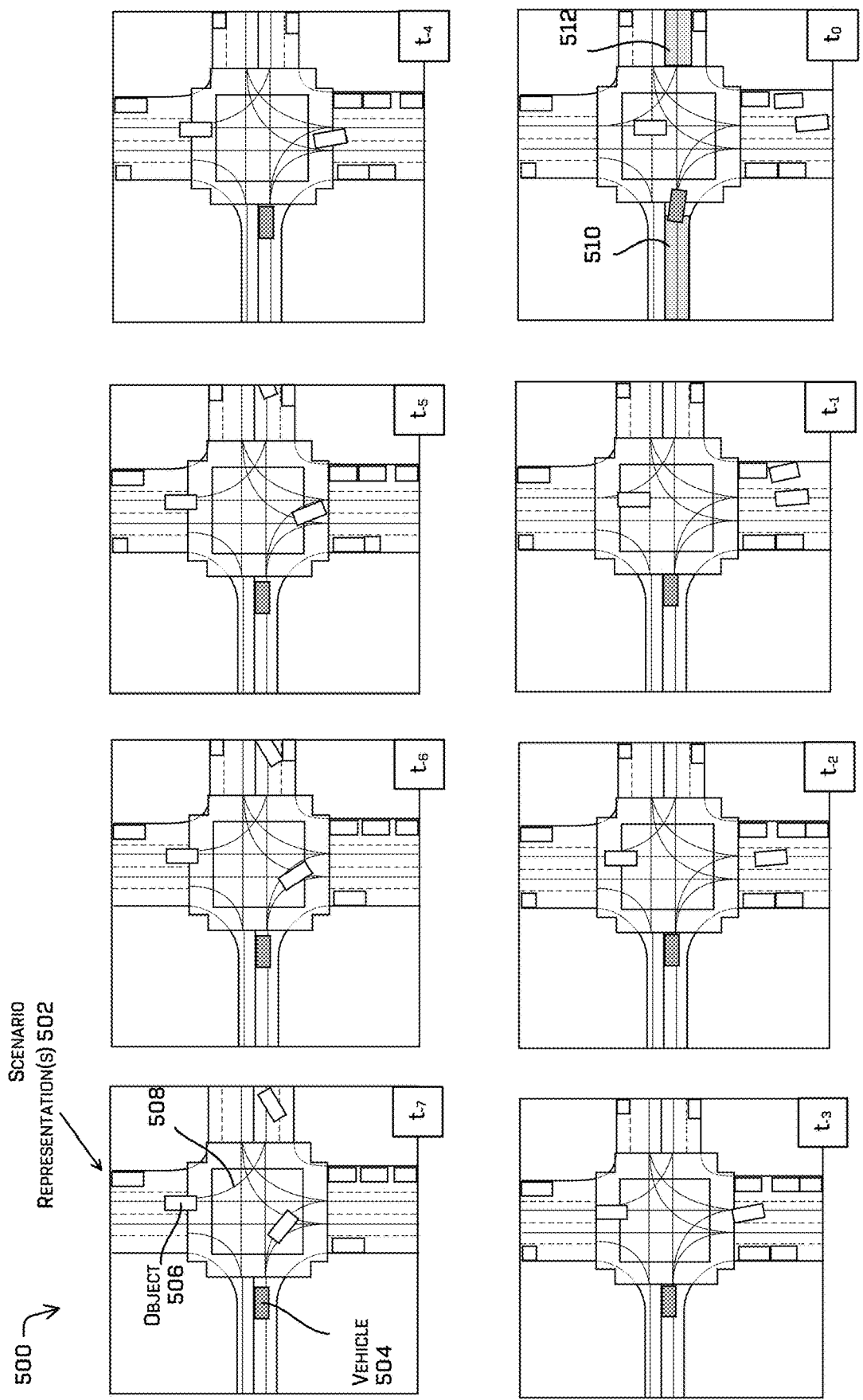
FIG. 5 depicts example illustrations of top-down representations of a scenario at different times that may be input to a model trained to output predicted top-down scenario representations, in accordance with examples of the disclosure.

FIG. 5 depicts example illustrations 500 of scenario data that may be input to a trained model in accordance with examples of the disclosure. In this example, scenario representations 502 may include top-down representations such as encodings, images, or other representations of a scenario, and may be provided as inputs to a trained model 406 configured to output or more predictions associated with the scenario. In this example, the scenario representations 502 represent various objects in the scenario at different previous points in time. For example, a time associated with each representation is illustrated in the lower-right corner (e.g., $t_{-8}$, $t_{-7}$, $t_{-6}$, $t_{-5}$, $t_{-4}$, $t_{-3}$, $t_{-2}$, $t_{-1}$, and $t_0$). As discussed above, each frame may represent a single channel or may be composed of several channels.

For example, an individual channel may represent, but are not limited to, one or more of a bounding box (e.g., a bounding box representing a vehicle 504 or an object 506, with a color or channel of the bounding box representing a classification of the object associated with the bounding box), a velocity of the bounding box in an x-direction and a y-direction (where a velocity can be represented as a number encoded in an area representing an area of another channel corresponding to the bounding box, with the x-velocity and the y-velocity represented in different channels), an acceleration of the object in an x-direction and a y-direction (where an acceleration can be represented as a vector in one channel or in multiple channels, with the x-acceleration and the y-acceleration represented in different channels), a blinker status associated with the bounding box (e.g., left-turn, right-turn, braking, reverse, hazards, no lights, etc.), road network information (e.g., semantic labels indicating lanes, reference lines (e.g., reference lines 508), crosswalks, stop signs, intersections, traffic lights, and the like), traffic light status (e.g., red light, yellow light, green light, etc.), and the like. In some examples, the plurality of channels can be input to the prediction system to generate at least one heat map.

Further, action data can be represented as a current lane 510 and a target lane 512. In some examples, action data can be encoded in one or more of the representations of the environment at times $t_{-7}$ through $t_0$.

In some instances, the top-down features within the scenario representations 502 may be represented as an image blob by stacking some or all of the feature images described above. In some examples, the resolution of the scenario representation(s) 502 can be set based on a resolution of a sensor resolution to 15 cm per pixel. In some examples, a single frame of the scenario representation 502 (e.g., a multi-channel image) can correspond to an area the size of 50 meters×50 meters, although any area can be selected. In some examples, the scenario representation(s) 502 can be rotated and translated so that the vehicle 504 (e.g., an autonomous vehicle) is facing from left to right and is approximately centered in the scenario representation 502 with a configurable horizontal offset. In some examples, the environment represented by the multi-channel images may represent non-traffic light junctions for prediction, in which case a traffic light state of each lane may not be included in the top-down representation.

Figure 6A:
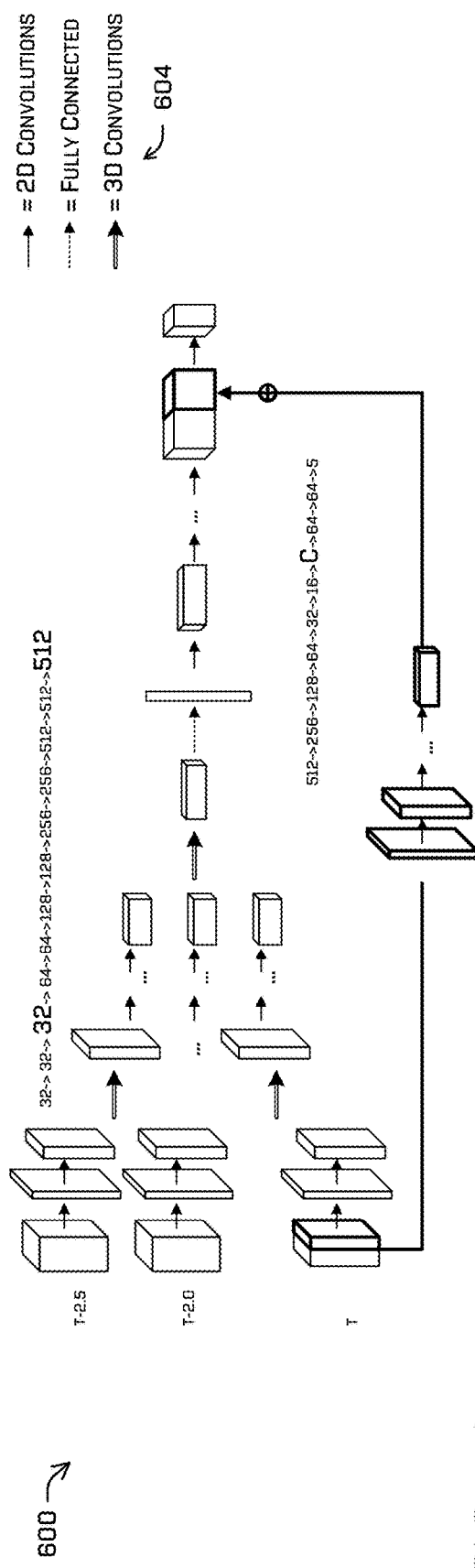
FIGS. 6A and 6B are illustrations of example architectures of a model trained to output one or more predicted top-down scenario representations
Figure 6B:
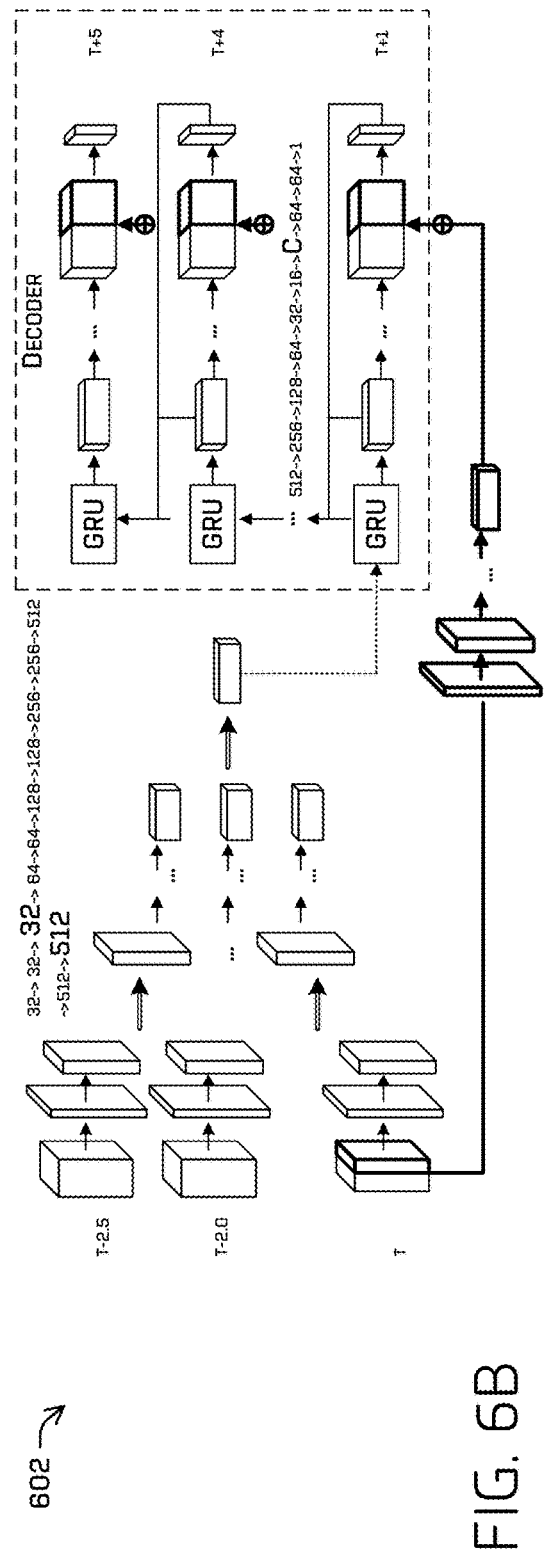

FIGS. 6A and 6B illustrate example architectures of trained models that may output predictions associated with a driving scenario, in accordance with embodiments of the disclosure. A first architecture is illustrated in FIG. 6A as an architecture 600, and a second architecture is illustrated in FIG. 6B as an architecture 602. A guide 604 defines various connections of components in the architectures 600 and 602.

As discussed above, in some examples the techniques discussed herein use a trained model having an encoder-decoder architecture for modeling the scenario, wherein the encoder maps the four-dimensional input tensor (e.g., time×space×channels) into an internal latent representation, and wherein the decoder uses the representation to model an output distribution over states at a pre-determined set of future time offsets (e.g., 1 second in the future, 2 seconds in the future, . . . , n seconds in the future, etc.).

With respect to an encoder, aspects include a convolutional neural network (CNN) backbone of two-dimensional (2D) convolutions (e.g., similar to VGG16), on each three-dimensional tensor of an input sequence. In some examples, temporal convolutions achieve better performance and significantly faster training than a recurrent neural network (RNN) structure. In some examples, to incorporate a temporal dimension, two three-dimensional convolutions can be added to an architecture. In some examples, a first 3D convolution can be added towards the beginning of the backbone, and in some examples, a second 3D convolution can be added towards the end of the backbone. In some examples, the first 3D convolution can be associated with a kernel size 3×3×3, and in some examples, the second 3D convolution can be associated with a kernel size 4×3×3. In some examples, the first and second 3D convolutions may or may not use padding.

With respect to a decoder, two example architectures are discussed herein: 1) "one-shot" prediction of some or all of the output sequence, and 2) an RNN-decoder that emits an output distribution at a single timestep at each inference recurrence step. The first architecture 600 shown in FIG. 6A is an example "one-shot" decoder, while the second architecture 602 shown in FIG. 6B is an example RNN-decoder. In some examples, with respect to the first architecture 600, a one-shot decoder uses a two-layer network to regress some or all of the distribution parameters at once, or a two-dimensional convolutional-transpose network with channels equal to a sequence length. In some examples, with respect to the second architecture 602, an RNN-decoder uses a single gated recurrent unit (GRU) cell, whose hidden output is used to regress the true output, which is then fed in as next input. For an occupancy grid map output representation, a semantic road map R is fed through a separate, shallow CNN tower (16→16→1 filters), yielding a spatial grid. This grid intuitively acts as a prior heatmap of static information that is appended to the decoder before applying softmax. In some examples, this architecture allows the model to easily penalize positions that correspond to obstacles and non-drivable surfaces.

In the example architectures 600 and 602, the neural networks depicted include multiple node layers, including input layers configured to receive scenario/environment input data, several intermediate layers between the input layers, and one or more output layers. In these examples, any of the intermediate layers may be selected as the intermediate layer from which multi-dimensional vectors are to be extracted. As noted above, in some cases it may be advantageous to select an intermediate layer having fewer nodes (e.g., a smallest number of nodes and lowest dimensionality encoding layer), as this may reduce the dimensionality of the vectors and of the multi-dimensional scenario representation space (e.g., 316) used to store and compare vectors. In other cases, intermediate layer of the neural network need not be a reduced dimensionality layer, but may be as large or larger than the input layer in terms of the number of the network nodes. An intermediate layer having a larger number of nodes may result in larger multi-dimensional vectors which may increase the computing resources required for vector storing and searching; however, extracting embeddings/vectors from higher-dimensionality layers also may provide advantages by providing a more detailed and accurate representation of the scenario. Additionally, in some examples, the scenario analysis system 300 may select an intermediate layer that maps primarily or entirely to input layer that is an objective representation of the scenario/environment, and rather than to any non-objective portions of the input layer, thereby producing vectors that are substantially objective and reproducible representations of driving scenarios.

Figure 7:
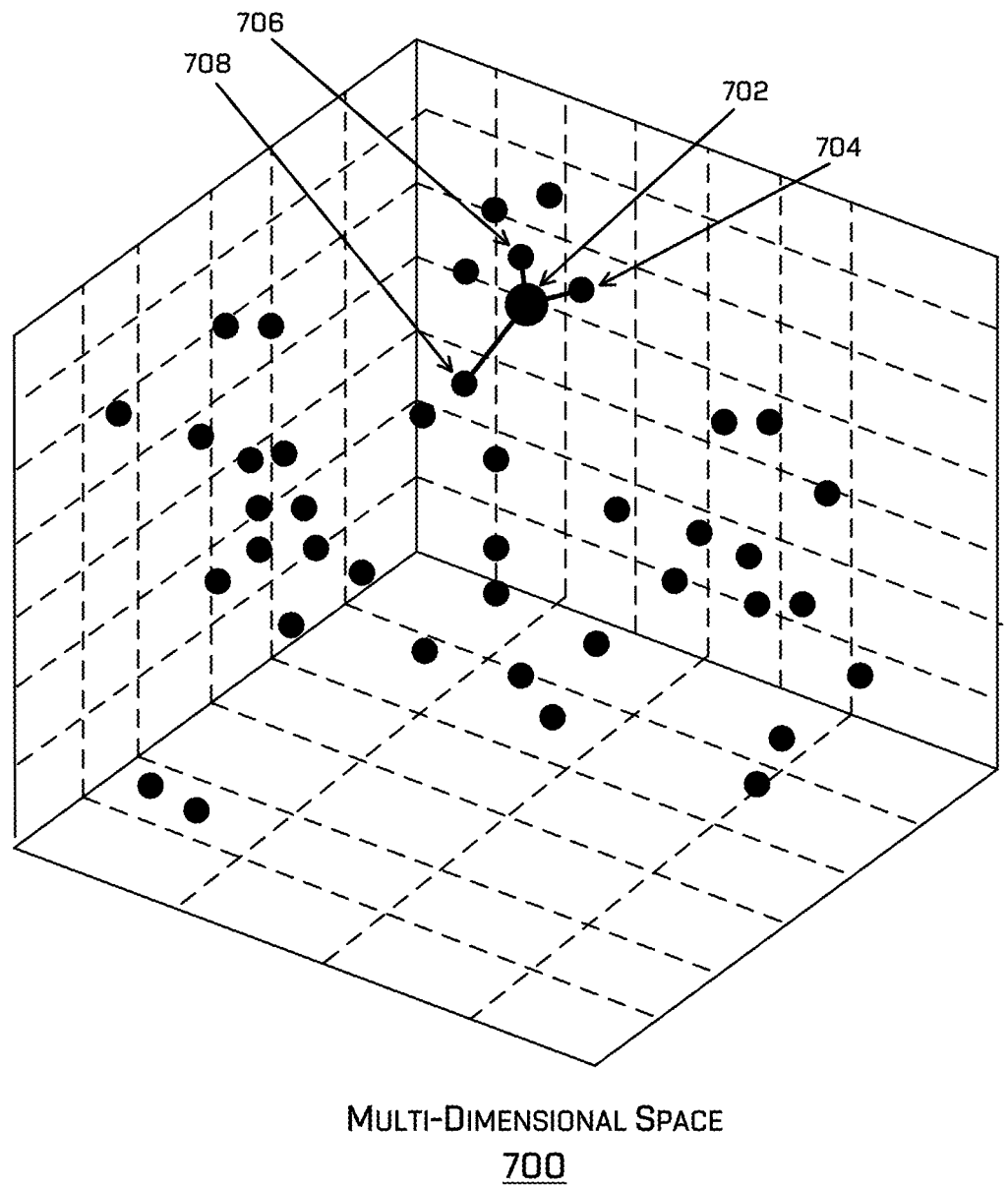
FIG. 7 illustrates an example multi-dimensional space including representations of vectors associated with scenarios, in accordance with implementations of the disclosure.

FIG. 7 illustrates an example multi-dimensional space 700 including a number of scenario representations, in accordance with implementations of the disclosure. As discussed above, a scenario analysis system 300 may store a number of vectors as multi-dimensional points or vectors that may be represented and compared within the multi-dimensional space 700. Each point depicted in the multi-dimensional space 700 may represent a vector extracted from the intermediate layer of a neural network, and each vector within the multi-dimensional space 700 may correspond to a driving scenario. The multi-dimensional space 700 in this example is represented as a three-dimensional space containing a relatively small number of vectors. However, in other examples the multi-dimensional space 700 may comprise dozens or hundreds of dimensions, and the scenario analysis system 300 may store millions or billions of different vectors that represent different driving scenarios.

Using the multi-dimensional space 700, the scenario analysis system 300 may execute a multi-dimensional proximity search algorithm (e.g., a nearest neighbor algorithm) to determine the closest additional vector(s) to an initial vector that is provided as input to the search algorithm. In this example, an input vector corresponding to input driving scenario is represented by point 702, and the execution of the proximity search algorithm has identified three additional vectors 704-708 with a closest multi-dimensional distance to the point 702 representing the input vector. Accordingly, in this example the scenario analysis system 300 may retrieve and return the driving scenarios associated with each vector 704-708 as the driving scenarios determined to be similar to the input scenario.

Figure 8:
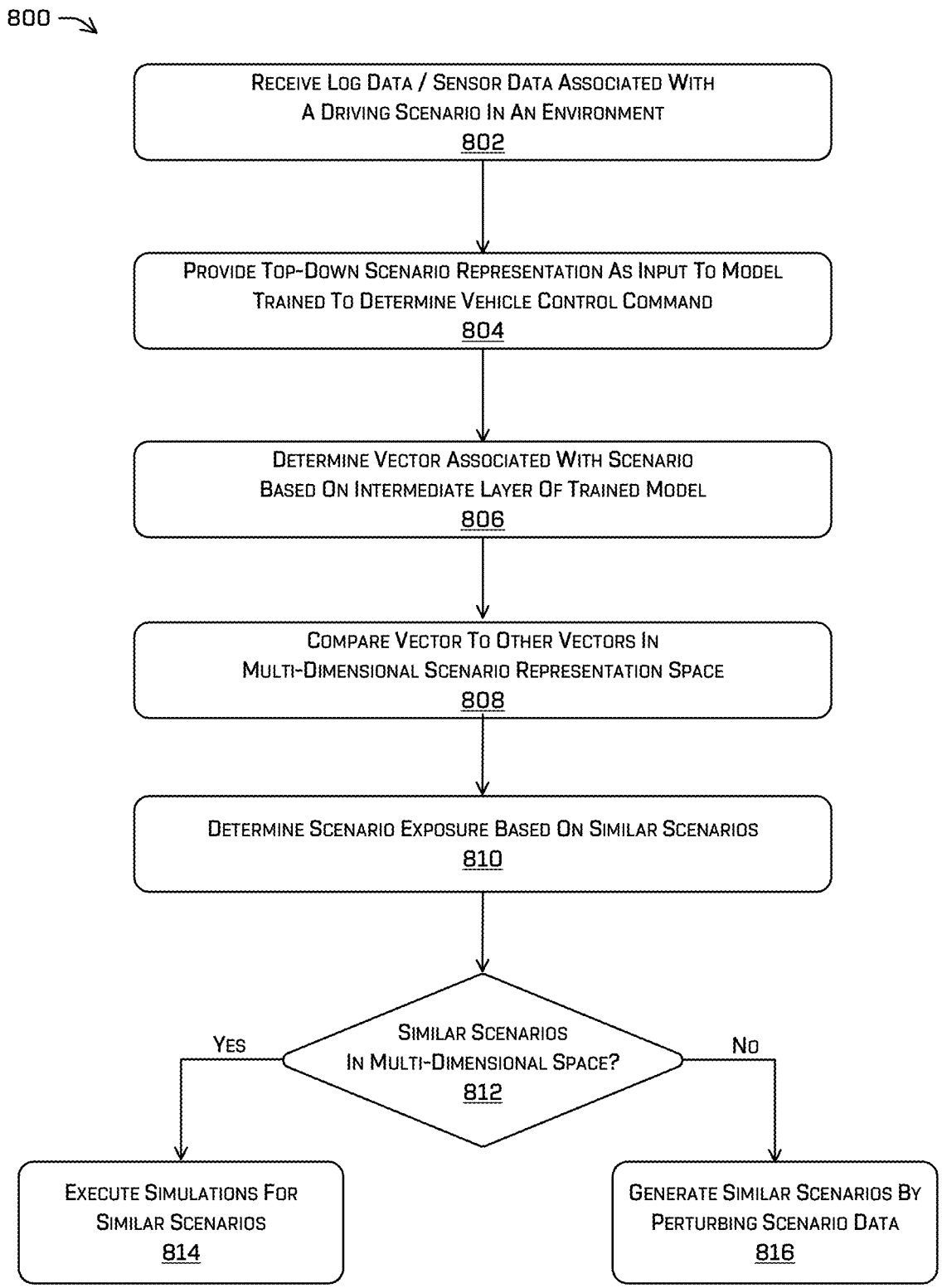
FIG. 8 is a flow diagram illustrating an example process of determining an exposure of a scenario and selecting similar scenarios, in accordance with implementations of the disclosure.

FIG. 8 is a flow diagram illustrating an example process 800 associated with the scenario analysis systems and techniques discussed above. In particular, process 800 describes determining a number of similar driving scenarios associated with an input scenario, determining an exposure metric for the input scenario, and executing similar scenarios and/or generating additional similar scenarios based on the input scenario. As discussed above, scenario analysis and the identification and/or generation of similar scenarios for use with simulation, modeling, and testing autonomous vehicles systems and software may assist with improving overall operations of the autonomous vehicles when encountering new or unexpected situations.

Process 800 is illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types. The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

At operation 802, a scenario analysis system 300 may receive log data and/or sensor data associated with a driving scenario. In some instances, a scenario representation component 306 may receive scenario input data including log data based on previous real-world driving operations and/or simulations, or sensor data based on a current real-world driving operations of a vehicle within an environment. The log data and/or sensor data may include data from any vehicle sensors, as well as perception data, prediction data, trajectory information, and the like.

At operation 804, the scenario analysis system 300 may provide the scenario data (e.g., as a top-down representation) as input a machine-learned model trained to output a prediction of a future scenario state, vehicle control command, or other autonomous driving-related determination. In some examples, a scenario representation component 306 may be configured to analyze and process log data, and generate a set of top-down scenario representations at a number of time intervals in a format compatible with the inputs of the trained model. For instance, the scenario representation component 306 may perform data extraction operations, filtering operations, and/or object detection operations, as described above. The scenario representation component 306 also may output a top-down scenario representation including environment data associated with a scenario, which may be arranged into occupancies based on discreet regions and time intervals.

At operation 806, the scenario analysis system 300 may determine a vector associated with the driving scenario data received at operation 802, by extracting a vector from an intermediate layer of the trained model. As describe above, a model extraction component 310 may be used in some examples, to provide input data from a scenario representation to the input layer(s) of a neural network of the trained model. The model extraction component 310 then may extract a vector from the trained model by detecting the outputs of nodes within an intermediate layer of the neural network.

At operation 808, the scenario analysis system 300 may compare the vector determined in operation 806 to additional vectors within a multi-dimensional space storing vectors associated with driving scenarios. In some examples, a scenario retrieval component 314 of the scenario analysis system 300 access a multi-dimensional scenario representations data store, and may use a nearest neighbor algorithm or other multi-dimensional proximity search to compare the vector determined in operation 806 with the additional vectors in the data store. Each vector may be stored as a multi-dimensional data point or vector that may be represented and compared to other vectors within the multi-dimensional space.

At operation 810, the scenario analysis system 300 may determine an exposure metric associated with the driving scenario data received at operation 802, based on the distances between the scenario vector and the additional vectors in the multi-dimensional space. In some examples, the scenario retrieval component 314 may determine a number or percentage of the vectors with the multi-dimensional space that are within a similarity threshold of the vector determined in operation 806. The similarity threshold may correspond to a distance in the multi-dimensional space, so that any vectors closer than the similarity threshold may be identified as similar to the input vector from operation 806, and any vectors farther away than the similarity threshold may be identified as not similar to the input vector. In some cases, the similarity threshold may require that only a vector must be identical to the input vector to be identified as similar.

As noted above, each vector represented in the multi-dimensional space may be associated with a driving scenario. Accordingly, in various implementations the scenario retrieval component 314 may determine the exposure metric in operation 810 as a raw number or a percentage of the driving scenarios that are similar to the driving scenario input in operation 802. The exposure metric determined in operation 810 may provide an indication of the number of times and/or frequency that a particular vehicle system failure or other vehicle behavior is likely to manifest for one or more autonomous vehicles operating in real-world environments.

At operation 812, the scenario analysis system 300 may select a number of similar scenarios based on the distances between the associated vectors in the multi-dimensional space. In some examples, the scenario analysis system 300 may use a similarity threshold in operation 812 (which may be the same as or different than the similarity threshold described above for determining the exposure metric associated with a driving scenario), to select all vectors and retrieve the associated scenarios that are within the threshold distance to the input vector in the multi-dimensional space. The scenario analysis system 300 then may determine whether the number of similar scenarios is greater than a desired or sufficient number of similar scenarios. As noted above, the desired or sufficient number of similar scenarios may be configurable by the scenario analysis system 300, based on the available computing resources for executing simulations and the vehicle testing and validation goals with respect to robust coverage for certain driving scenarios.

When the scenario analysis system 300 determines that a sufficient number of driving scenarios similar to the input scenario have been identified (812:Yes), then at operation 814 the scenario analysis system 300 may generate and execute one or more driving simulations based on the similar scenarios selected in operation 812. In contrast, when the scenario analysis system 300 determines that a sufficient number of driving scenarios similar to the input scenario have not been identified (812:No), then at operation 816 the scenario analysis system 300 may generate one or more new synthetic driving scenarios similar to the input scenario. For instance, the scenario analysis system 300 may perturb one or more of the scenario data input values provided to the trained model in operation 804, thereby generating a modified driving scenario based on the input scenario. The scenario analysis system 300 then may continue with operations 806, 808, and 812 for the modified scenario, to determine if the newly generated modified scenario is sufficiently similar to the input scenario received in operation 802. This process of generating anew driving scenario by perturbing scenario input data values (e.g., via random selection of an input and a perturbation value), and then calculating the multi-dimensional distance between the vectors for the input scenario and new scenario to determine the level of similarity between the scenarios, may be repeated by the scenario analysis system 300 until a sufficient number of similar driving scenario have been generated and verified for the input scenario.

Figure 9:
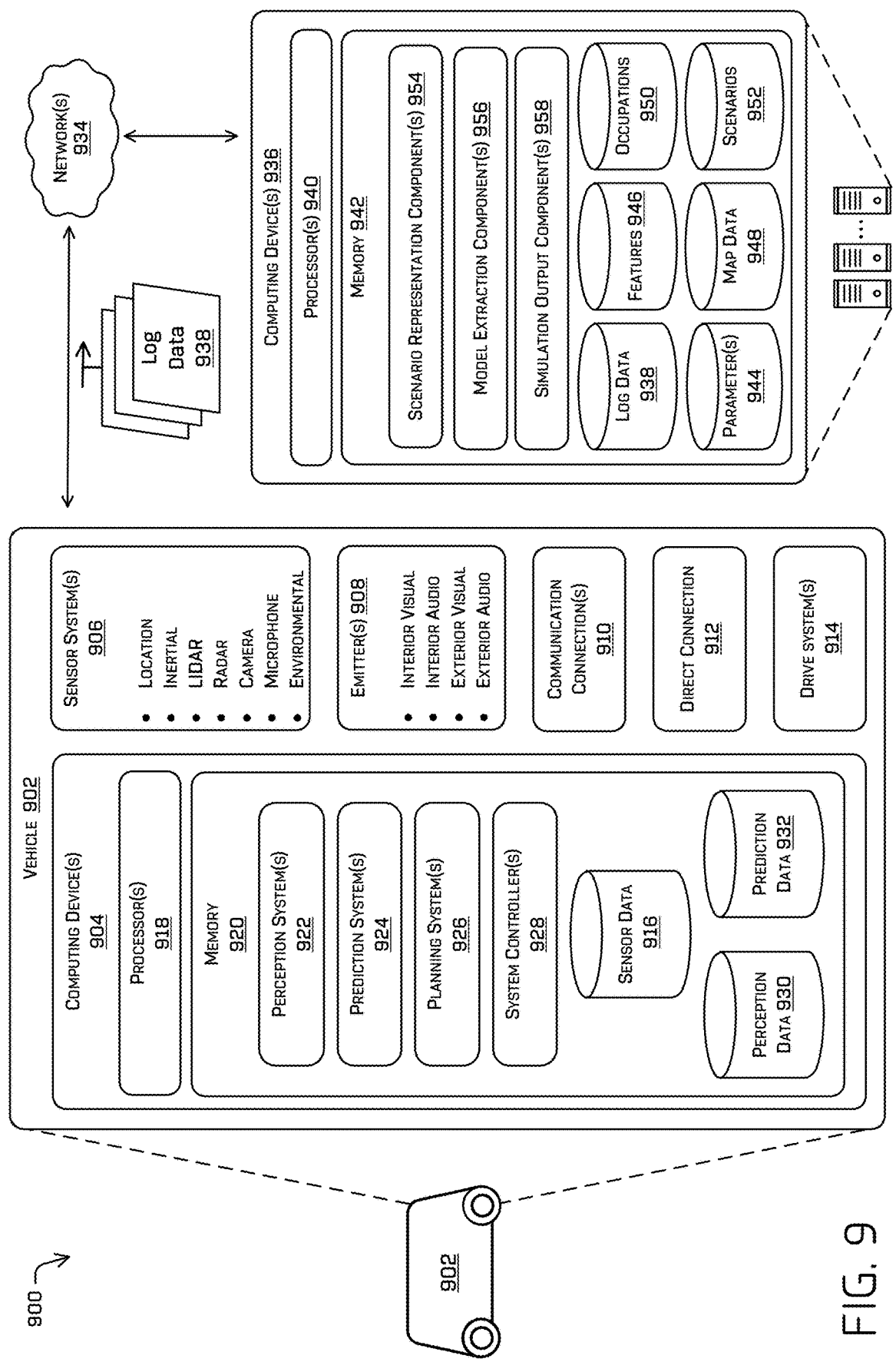
FIG. 9 depicts a block diagram of an example system for implementing the techniques discussed herein.

FIG. 9 depicts a block diagram of an example system 900 for implementing the techniques discussed herein. In at least one example, the system 900 may include a vehicle 902, such any autonomous vehicle (e.g., fully or semi-autonomous vehicle) discussed above. The vehicle 902 may include computing device(s) 904, one or more sensor system(s) 906, one or more emitter(s) 908, one or more communication connection(s) 910 (also referred to as communication devices and/or modems), at least one direct connection 912 (e.g., for physically coupling with the vehicle 902 to exchange data and/or to provide power), and one or more drive system(s) 914. The one or more sensor system(s) 906 may be configured to capture the sensor data 916 associated with a surrounding physical environment.

In at least some examples, the sensor system(s) 906 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 906 may include multiple instances of each type of sensors. For instance, time-of-flight sensors may include individual time-of-flight sensors located at the corners, front, back, sides, and/or top of the vehicle 902. As another example, camera sensors may include multiple cameras disposed at various locations about the exterior and/or interior of the vehicle 902. In some cases, the sensor system(s) 906 may provide input to the computing device(s) 904.

The vehicle 902 may also include one or more emitter(s) 908 for emitting light and/or sound. The one or more emitter(s) 908 in this example include interior audio and visual emitters to communicate with passengers of the vehicle 902. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 908 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 902 can also include one or more communication connection(s) 910 that enable communication between the vehicle 902 and one or more other local or remote computing device(s) (e.g., a remote teleoperations computing device) or remote services. For instance, the communication connection(s) 910 can facilitate communication with other local computing device(s) on the vehicle 902 and/or the drive system(s) 914. Also, the communication connection(s) 910 may allow the vehicle 902 to communicate with other nearby computing device(s) (e.g., other nearby vehicles, traffic signals, etc.).

The communications connection(s) 910 may include physical and/or logical interfaces for connecting the computing device(s) 904 to another computing device or one or more external network(s) 934 (e.g., the Internet). For example, the communications connection(s) 910 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 910 may comprise the one or more modems as described in detail above.

In at least one example, the vehicle 902 may include one or more drive system(s) 914. In some examples, the vehicle 902 may have a single drive system 914. In at least one example, if the vehicle 902 has multiple drive systems 914, individual drive systems 914 may be positioned on opposite ends of the vehicle 902 (e.g., the front and the rear, etc.). In at least one example, the drive system(s) 914 can include one or more sensor system(s) 906 to detect conditions of the drive system(s) 914 and/or the surroundings of the vehicle 902. By way of example and not limitation, the sensor system(s) 906 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 914. In some cases, the sensor system(s) 906 on the drive system(s) 914 can overlap or supplement corresponding systems of the vehicle 902 (e.g., sensor system(s) 906).

The drive system(s) 914 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 914 can include a drive system controller which may receive and preprocess data from the sensor system(s) 906 and to control operation of the various vehicle systems. In some examples, the drive system controller can include one or more processor(s) and memory communicatively coupled with the one or more processor(s). The memory can store one or more modules to perform various functionalities of the drive system(s) 914. Furthermore, the drive system(s) 914 also include one or more communication connection(s) that enable communication by the respective drive system with one or more other local or remote computing device(s).

The computing device(s) 904 may include one or more processors 918 and one or more memories 920 communicatively coupled with the processor(s) 918. In the illustrated example, the memory 920 of the computing device(s) 904 stores perception systems(s) 922, prediction systems(s) 924, planning systems(s) 926, as well as one or more system controller(s) 1028. The memory 920 may also store data such as sensor data 916 captured or collected by the one or more sensors systems 906, perception data 930 associated with the processed (e.g., classified and segmented) sensor data 916, prediction data 932 associated with one or more predicted state of the environment and/or detected objects within the environment. Though depicted as residing in the memory 920 for illustrative purposes, it is contemplated that the perception systems(s) 922, prediction systems(s) 924, planning systems(s) 926, as well as one or more system controller(s) 928 may additionally, or alternatively, be accessible to the computing device(s) 904 (e.g., stored in a different component of vehicle 902 and/or be accessible to the vehicle 902 (e.g., stored remotely).

The perception system 922 may be configured to perform object detection, segmentation, and/or classification on the sensor data 916. In some examples, the perception system 922 may generate processed perception data 930 from the sensor data 916. The perception data 930 may indicate a presence of objects that are in physical proximity to the vehicle 902 and/or a classification or type of the objects (e.g., car, pedestrian, cyclist, building, tree, road surface, curb, sidewalk, unknown, etc.). In additional and/or alternative examples, the perception system 922 may generate or identify one or more characteristics associated with the objects and/or the physical environment. In some examples, characteristics associated with the objects may include, but are not limited to, an x-position, a y-position, a z-position, an orientation, a type (e.g., a classification), a velocity, a size, a direction of travel, etc. Characteristics associated with the environment may include, but are not limited to, a presence of another object, a time of day, a weather condition, a geographic position, an indication of darkness/light, etc. For example, details of classification and/or segmentation associated with a perception system are discussed in U.S. application Ser. No. 15/820,245, which are herein incorporated by reference in their entirety.

The prediction system 924 may be configured to determine a track corresponding to an object identified by the perception system 922. For example, the prediction system 924 may be configured to predict a velocity, position, change in trajectory, or otherwise predict the decisions and movement of the identified objects. For example, the prediction system 924 may include one or more machine learned models that may, based on inputs such as object type or classification and object characteristics, output predicted characteristics of the object at one or more future points in time. For example, details of predictions systems are discussed in U.S. application Ser. Nos. 16/246,208 and 16/420,050, which are herein incorporated by reference in their entirety.

The planning system 926 may be configured to determine a route for the vehicle 902 to follow to traverse through an environment. For example, the planning system 926 may determine various routes and paths and various levels of detail based at least in part on the objects detected, the predicted characteristics of the object at future times, and a set of safety requirements corresponding to the current scenario (e.g., combination of objects detected and/or environmental conditions). In some instances, the planning system 926 may determine a route to travel from a first location (e.g., a current location) to a second location (e.g., a target location) in order to avoid an object obstructing or blocking a planned path of the vehicle 902. In some case, a route can be a sequence of waypoints for traveling between the two locations (e.g., the first location and the second location). In some cases, waypoints include streets, intersections, global positioning system (GPS) coordinates, etc. For example, details of path and route planning by the planning system are discussed in U.S. application Ser. Nos. 16/805,118 and 15/632,208, which are herein incorporated by reference, in its entirety.

In at least one example, the computing device(s) 904 may store one or more and/or system controllers 928, which may be configured to control steering, propulsion, braking, safety, emitters, communication, and other systems of the vehicle 902. The system controllers 928 may communicate with and/or control corresponding systems of the drive system(s) 914 and/or other components of the vehicle 902, which may be configured to operate in accordance with a route provided from the planning system 926.

In some implementations, the vehicle 902 may connect to computing device(s) 936 via the network(s) 934. For example, the computing device(s) 936 may receive log data 938 from one or more vehicles 902. The log data 938 may include the sensor data, perception data 930, prediction data 932 and/or a combination thereof. In some cases, the log data 938 may include portion of one or more of the sensor data, perception data 930, prediction data 932.

The computing device 936 may include one or more processors 940 and memory 942 communicatively coupled with the one or more processors 940. In at least one instance, the processor(s) 940 may be similar to the processor(s) 918 and the memory 942 may be similar to the memory 920. In the illustrated example, the memory 942 of the computing device(s) 936 stores the log data 938 received from one or more vehicles 902. The memory 942 may also store parameters 944 associated with objects and/or the vehicle 902 represented in the log data 938, features 946 associated with the environment represented in the log data 938, map data 948, occupations 950 determined from the log data 938, and scenarios 952 generated based at least in part on the occupations 950. The memory 942 may also store a scenario representation component 954, a model extraction component 956, and a simulation output component 958.

The scenario representation component 954 may be similar or identical to the scenario representation component 306 described above in reference to FIG. 3. In some examples, the scenario representation component 954 may analyze sensor data and/or log data to determine input data for a trained model representative of a driving scenario. As described above, the scenario representation component 954 may be configured to perform data extraction operations, data filtering of sensor data and/or log data, object detection, occupation determination and arrangement, etc. In some examples, the scenario representation component 954 may generate an object-based occupation-based, region-based, and time-based arrangement of input data representing a driving scenario, which may be provided to the model extraction component 956.

The model extraction component 956 may receive input data representing a driving scenario from the scenario representation component 954, and provide the scenario data as input to one or more trained machine-learned models. As discussed above, the trained models may be configured to perform various autonomous vehicle control decisions and/or driving determinations based on the scenario input data. In some examples, a trained model may include multiple layers of interconnected nodes, and the model extraction component 956 may provide data representing a scenario to the input layer of the trained model and then may extract a vector based on the output from an intermediate layer of a neural network.

The simulation output component 958 may include functionality similar or identical to a combination of the scenario retrieval component 314 and the scenario/simulation output component 320, as discussed above in reference to FIG. 3. For example, the simulation output component 958 may be configured to access a data store (e.g., multi-dimensional space) storing vectors that represent scenarios, and to retrieve one or more vectors based on the extracted vector representing the input scenario. In some examples, the simulation output component 958 may use a nearest neighbor algorithm or other multi-dimensional proximity search to retrieve additional vectors within a multi-dimensional space. The additional vectors selected by the simulation output component 958 may represent the closest vectors within the multi-dimensional space, and each additional vector may be associated with a different scenario previously analyzed and stored multi-dimensional space.

The processor(s) 918 of the computing device(s) 904 and the processor(s) 940 of the computing device(s) 936 may be any suitable processor capable of executing instructions to process data and perform operations as described herein. By way of example and not limitation, the processor(s) 918 and 936 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 920 of the computing device(s) 904 and the memory 942 of the computing device(s) 936 are examples of non-transitory computer-readable media. The memory 920 and 942 can store an operating system and one or more software applications, instructions, programs, and/or data to implement the methods described herein and the functions attributed to the various systems. In various implementations, the memory 920 and 942 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 920 and 942 can be implemented as a neural network.

Example Clauses

A. A system comprising: one or more processors; and one or more non-transitory computer-readable media storing instructions that, when executed by the one or more processors, cause the one or more processors to perform operations comprising: receiving log data associated with a vehicle, the log data representing a first scenario of the vehicle operating in an environment; determining, based at least in part on the log data, a multi-channel top-down representation of the scenario; providing the multi-channel top-down representation as input to a trained model configured to output a predicted top-down representation associated with the first scenario, wherein the trained model comprises a neural network comprising an input layer and an output layer; determining a first vector associated with the first scenario, based on an output of an intermediate layer of the neural network; determining that that a second vector is within a threshold distance to the first vector, wherein the first vector and the second vector are represented in a multi-dimensional space; determining, based at least in part on the second vector, a second scenario; and performing an action based at least in part on the second scenario.

B. The system as recited in paragraph A, wherein performing the action comprises at least one of: executing a simulation based on the second scenario to determine a response of an autonomous vehicle controller to the simulation; determining a number of additional scenarios associated with the first scenario, by comparing the first vector to each of a plurality of additional vectors represented in the multi-dimensional space, using the threshold distance; generating the second scenario by perturbing one or more values of the log data representing the first scenario; or outputting a vehicle control action associated with the vehicle.

C. The system as recited in paragraph A, the operations further comprising: receiving the first vector from an encoder layer of the trained model, wherein the encoder layer is associated with a lowest dimensionality of the trained model.

D. The system as recited in paragraph A, wherein providing the input to the trained model comprises: inputting a plurality of multi-channel top-down representations associated with the first scenario over time.

E. The system as recited in paragraph A, the operations further comprising: determining a vehicle system failure associated with the first scenario; accessing a data store comprising a plurality of additional vectors, wherein a unique vector within the data stored is associated with a unique scenario; and determining a number of additional scenarios associated with the vehicle system failure, by comparing the first vector to each of the plurality of additional vectors, wherein the comparing is based at least in part on a similarly threshold associated with the multi-dimensional space.

F. A method comprising: receiving data representing a first scenario of a first vehicle operating in a first environment; inputting the data to a neural network, wherein the neural network includes an input layer and an output layer; receiving, from an intermediate layer of the neural network, a first vector associated with the first scenario; determining, based at least in part on a multi-dimensional proximity search, a second vector; and determining, based at least in part on the second vector, a second scenario of a vehicle operating in an environment.

G. The method of paragraph F, wherein the input layer of the neural network comprises an encoder layer, and wherein the output layer of the neural network comprises a decoder layer, and wherein the neural network is associated with a trained machine-learned model.

H. The method of paragraph G, wherein receiving the first vector comprises: receiving the first vector from an encoder layer of the trained model, wherein the encoder layer is associated with a lowest dimensionality of the trained model.

I. The method of paragraph F, wherein inputting the data comprises: inputting to the neural network a first multi-channel top-down representation associated with the first scenario at a first time; and inputting to the neural network a second multi-channel top-down representation associated with the first scenario at a second time different from the first time, wherein the first vector is based at least in part on the first multi-channel top-down representation and the second multi-channel top-down representation.

J. The method of paragraph F, further comprising: determining data representing a third scenario, including perturbing one or more values of the data representing the first scenario; inputting the data representing the third scenario to the neural network; and receiving, from the intermediate layer of the neural network, a third vector associated with the third scenario.

K. The method of paragraph F, further comprising: determining a vehicle system failure associated with the first scenario; accessing a data store comprising a plurality of additional vectors, wherein a unique vector within the data stored is associated with a unique scenario; and determining a number of additional scenarios associated with the vehicle system failure, by comparing the first vector to each of the plurality of additional vectors, wherein the comparing is based at least in part on a similarly threshold associated with the multi-dimensional proximity search.

L. The method of paragraph F, further comprising: executing a simulation based on the second scenario to determine a response of an autonomous vehicle controller to the simulation.

M. The method of paragraph F, further comprising: determining that the second scenario is associated with a risk; and performing a vehicle control action on the first vehicle operating in the first environment, based at least in part on determining that the second scenario is associated with the risk.

N. One or more non-transitory computer-readable media storing processor-executable instructions that, when executed by one or more processors, cause the one or more processors to perform operations comprising: receiving data representing a first scenario of a first vehicle operating in a first environment; inputting the data to a neural network, wherein the neural network includes an input layer and an output layer; receiving, from an intermediate layer of the neural network, a first vector associated with the first scenario; determining, based at least in part on a multi-dimensional proximity search, a second vector; and determining, based at least in part on the second vector, a second scenario of a vehicle operating in an environment.

O. The non-transitory computer-readable medium of paragraph N, wherein the input layer of the neural network comprises an encoder layer, and wherein the output layer of the neural network comprises a decoder layer, and wherein the neural network is associated with a trained machine-learned model.

P. The non-transitory computer-readable medium of paragraph O, wherein receiving the first vector comprises: receiving the first vector from an encoder layer of the trained model, wherein the encoder layer is associated with a lowest dimensionality of the trained model.

Q. The non-transitory computer-readable medium of paragraph N, wherein inputting the data comprises: inputting to the neural network a first multi-channel top-down representation associated with the first scenario at a first time; and inputting to the neural network a second multi-channel top-down representation associated with the first scenario at a second time different from the first time, wherein the first vector is based at least in part on the first multi-channel top-down representation and the second multi-channel top-down representation.

R. The non-transitory computer-readable medium of paragraph N, the operations further comprising: determining data representing a third scenario, including perturbing one or more values of the data representing the first scenario; inputting the data representing the third scenario to the neural network; and receiving, from the intermediate layer of the neural network, a third vector associated with the third scenario.

S. The non-transitory computer-readable medium of paragraph N, the operations further comprising: determining a vehicle system failure associated with the first scenario; accessing a data store comprising a plurality of additional vectors, wherein a unique vector within the data stored is associated with a unique scenario; and determining a number of additional scenarios associated with the vehicle system failure, by comparing the first vector to each of the plurality of additional vectors, wherein the comparing is based at least in part on a similarly threshold associated with the multi-dimensional proximity search.

T. The non-transitory computer-readable medium of paragraph N, the operations further comprising: executing a simulation based on the second scenario to determine a response of an autonomous vehicle controller to the simulation.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

Conclusion

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples.

A non-limiting list of agents and other objects in an environment may include but is not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing instructions that, when executed by the one or more processors, cause the one or more processors to perform operations comprising:
receiving log data associated with a vehicle operating in a first driving environment, the log data including vehicle state data associated with the vehicle, and sensor data representing the first driving environment;
determining, based at least in part on the log data, a first multi-channel top-down scenario representation of the first driving environment;
providing the first multi-channel top-down scenario representation as input to a prediction system configured to output a predicted top-down scenario representation associated with the first driving environment, wherein the prediction system comprises a neural network trained to output a predicted future scenario representation, the neural network comprising an input encoding layer and an output decoding layer;
determining a first scenario vector associated with the predicted future scenario representation, based on an output of an intermediate layer of the neural network of the prediction system;
determining that a second scenario vector is within a threshold distance to the first scenario vector, wherein the first scenario vector and the second scenario vector are represented in a multi-dimensional space;
determining, based at least in part on the second scenario vector, a second scenario representation of a second driving environment, wherein the second driving environment is different from the first driving environment; and
executing a driving simulation, based at least in part on the second scenario representation, to determine a response of an autonomous vehicle controller.

2. The system as recited in claim 1, the operations further comprise at least one of:
determining a number of additional scenarios associated with the first multi-channel top-down scenario representation, by comparing the first scenario vector to each of a plurality of additional scenario vectors represented in the multi-dimensional space, using the threshold distance;
generating the second scenario representation by perturbing one or more values of the log data; or
outputting a vehicle control action associated with the vehicle.

3. The system as recited in claim 1, the operations further comprising:
receiving the first scenario vector from the intermediate layer, wherein the intermediate layer is a lowest dimensionality layer of the neural network.

4. The system as recited in claim 1, wherein providing the first multi-channel top-down scenario representation as input to the prediction system comprises:
inputting a plurality of multi-channel top-down representations associated with the first driving environment over time.

5. The system as recited in claim 1, the operations further comprising:
determining a vehicle system failure associated with the first multi-channel top-down scenario representation;
accessing a data store comprising a plurality of additional vectors, wherein a unique vector within the data store is associated with a unique scenario; and
determining a number of additional scenarios associated with the vehicle system failure, by comparing the first scenario vector to each of the plurality of additional vectors, wherein the comparing is based at least in part on a proximity search of the multi-dimensional space of scenario vectors.

6. A method comprising:
receiving sensor data associated with a first driving environment of a vehicle;
determining, based at least in part on the sensor data, a first scenario representation of the first driving environment;
inputting the first scenario representation to a prediction system including a neural network trained to output a predicted future scenario representation;
determining, based on an output of the prediction system, a first scenario vector associated with the predicted future scenario representation;
determining, based at least in part on a search in a multi-dimensional space of scenario vectors, a second scenario vector associated with the first scenario vector;
determining, based at least in part on the second scenario vector, a second scenario representation of a second driving environment, wherein the second driving environment is different from the first driving environment; and
executing a driving simulation based on the second scenario representation to determine a response of an autonomous vehicle controller.

7. The method of claim 6, wherein the neural network comprises an encoder-decoder architecture, including an input layer comprising an encoder layer, an output layer comprising a decoder layer, and an intermediate layer having a lower dimensionality than the input layer or the output layer.

8. The method of claim 7, wherein determining the first scenario vector comprises:
receiving the first scenario vector from the intermediate layer, wherein the in intermediate layer is a lowest dimensionality layer of the neural network.

9. The method of claim 6, wherein inputting the first scenario representation comprises:
inputting to the neural network a first multi-channel top-down representation associated with the first driving environment at a first time; and
inputting to the neural network a second multi-channel top-down representation associated with the first driving environment at a second time different from the first time,
wherein the first scenario vector is based at least in part on the first multi-channel top-down representation and the second multi-channel top-down representation.

10. The method of claim 6, further comprising:
determining data representing a third scenario representation, including perturbing one or more values of the data representing the first scenario representation;
inputting the data representing the third scenario representation to the neural network; and receiving, from an intermediate layer of the neural network, a third scenario vector associated with the third scenario representation.

11. The method of claim 6, further comprising:
determining a vehicle system failure associated with the first scenario representation;
accessing a data store comprising a plurality of additional vectors, wherein a unique vector within the data store is associated with a unique scenario; and
determining a number of additional scenarios associated with the vehicle system failure, by comparing the first scenario vector to each of the plurality of additional vectors, wherein the comparing is based at least in part on a proximity search of the multi-dimensional space of scenario vectors.

12. The method of claim 6, further comprising:
determining that the second scenario representation is associated with a risk; and
performing a vehicle control action on the vehicle operating in the first driving environment, based at least in part on determining that the second scenario representation is associated with the risk.

13. The method of claim 6, wherein the second scenario representation comprises second sensor data captured by a second vehicle different from the vehicle within the second driving environment.

14. One or more non-transitory computer-readable media storing processor-executable instructions that, when executed by one or more processors, cause the one or more processors to perform operations comprising:
receiving sensor data associated with a first driving environment of a vehicle;
determining, based at least in part on the sensor data, a first scenario representation of the first driving environment;
inputting the first scenario representation to a neural network, wherein the neural network includes an input layer and an output layer;
inputting the first scenario representation to a prediction system including a neural network trained to output a predicted future scenario representation;
determining, based on an output of the prediction system, a first scenario vector associated with the predicted future scenario representation;
determining, based at least in part on a search in a multi-dimensional space of scenario vectors, a second scenario vector associated with the first scenario vector;
determining, based at least in part on the second scenario vector, a second scenario representation of a second driving environment, wherein the second driving environment is different from the first driving environment; and
executing a driving simulation based on the second scenario representation to determine a response of an autonomous vehicle controller.

15. The one or more non-transitory computer-readable medium of claim 14, wherein the neural network comprises an encoder-decoder architecture, including an input layer comprising an encoder layer, an output layer comprising a decoder layer, and an intermediate layer having a lower dimensionality than the input layer or the output layer.

16. The one or more non-transitory computer-readable medium of claim 15, wherein determining the first scenario vector comprises:
receiving the first scenario vector from the intermediate layer, wherein the intermediate layer is a lowest dimensionality layer of the neural network.

17. The one or more non-transitory computer-readable medium of claim 14, wherein inputting the first scenario representation comprises:
inputting to the neural network a first multi-channel top-down representation associated with the first driving environment at a first time; and
inputting to the neural network a second multi-channel top-down representation associated with the first driving environment at a second time different from the first time,
wherein the first scenario vector is based at least in part on the first multi-channel top-down representation and the second multi-channel top-down representation.

18. The one or more non-transitory computer-readable medium of claim 14, the operations further comprising:
determining data representing a third scenario representation, including perturbing one or more values of the data representing the first scenario representation;
inputting the data representing the third scenario representation to the neural network; and
receiving, from an intermediate layer of the neural network, a third scenario vector associated with the third scenario representation.

19. The one or more non-transitory computer-readable medium of claim 14, wherein the first scenario representation of the first driving environment is based at least in part on:
vehicle state data associated the vehicle at a first time in the first driving environment;
a planned driving path of the vehicle in the first driving environment;
object data for a first object represented in the sensor data, at the first time; and
road configuration data associated with the first driving environment.

20. The one or more non-transitory computer-readable medium of claim 19, wherein the first scenario representation includes movement information over time for the vehicle and the first object within the first driving environment.

* * * * *